US012335801B2

(12) United States Patent
Wang et al.

(10) Patent No.: US 12,335,801 B2
(45) Date of Patent: Jun. 17, 2025

(54) NETWORK RESOURCE CONFIGURATION METHOD AND APPARATUS

(71) Applicant: HUAWEI TECHNOLOGIES CO., LTD., Guangdong (CN)

(72) Inventors: Xiaolu Wang, Hangzhou (CN); Hejia Luo, Hangzhou (CN); Rong Li, Hangzhou (CN); Bin Wang, Hangzhou (CN); Jun Wang, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 418 days.

(21) Appl. No.: 17/883,388

(22) Filed: Aug. 8, 2022

(65) Prior Publication Data

US 2022/0386200 A1 Dec. 1, 2022

Related U.S. Application Data

(63) Continuation of application No. PCT/CN2021/070347, filed on Jan. 5, 2021.

(30) Foreign Application Priority Data

Feb. 10, 2020 (CN) .......................... 202010085314.1

(51) Int. Cl.
*H04W 36/00* (2009.01)
*H04B 7/185* (2006.01)
(Continued)

(52) U.S. Cl.
CPC .......... *H04W 36/06* (2013.01); *H04B 7/1851* (2013.01); *H04W 36/0094* (2013.01);
(Continued)

(58) Field of Classification Search
CPC ............ H04W 36/06; H04W 36/0094; H04W 36/362; H04W 36/00835; H04W 36/302;
(Continued)

(56) References Cited

U.S. PATENT DOCUMENTS 9,537,981 B2 * 1/2017 You ..................... H04L 25/0226
11,412,424 B2 * 8/2022 Jokela ............... H04W 36/0072
(Continued)

FOREIGN PATENT DOCUMENTS

CN 101951648 A 1/2011
CN 104272804 B 12/2017
(Continued)

OTHER PUBLICATIONS

Extended European Search Report in European Appln No. 21754235.6, dated Jun. 22, 2023, 11 pages.
(Continued)

*Primary Examiner* — Andrew Wendell
(74) *Attorney, Agent, or Firm* — Fish & Richardson P.C.

(57) ABSTRACT

This application provides example network resource configuration methods and apparatuses. One example method includes receiving configuration information from a network device, where the configuration information includes information of a first threshold corresponding to at least one candidate cell, and the first threshold includes at least one of a Doppler frequency shift threshold, a timing advance TA rate threshold, or a Doppler frequency shift change rate threshold. A target cell is determined from the at least one candidate cell based on the configuration information. A handover to the target cell is initiated.

20 Claims, 7 Drawing Sheets

(51) Int. Cl.
*H04W 36/06* (2009.01)
*H04W 36/36* (2009.01)
*H04W 36/30* (2009.01)

(52) U.S. Cl.
CPC .... *H04W 36/362* (2023.05); *H04W 36/00835* (2018.08); *H04W 36/302* (2023.05)

(58) Field of Classification Search
CPC ......... H04W 36/0055; H04W 36/0058; H04W 24/02; H04B 7/1851; H04B 7/1855; H04B 7/18539; H04B 17/382
See application file for complete search history.

(56) References Cited

U.S. PATENT DOCUMENTS

| | | | |
|---|---|---|---|
| 2012/0289233 | A1 | 11/2012 | Medbo et al. |
| 2015/0079988 | A1* | 3/2015 | Su .................. H04W 36/0058 455/436 |
| 2016/0345228 | A1* | 11/2016 | Liu ...................... H04W 36/20 |
| 2017/0150365 | A1* | 5/2017 | Goswami .............. H04W 16/18 |
| 2017/0171792 | A1 | 6/2017 | Axmon et al. |
| 2017/0208600 | A1* | 7/2017 | Hsu ......................... H04B 7/01 |
| 2018/0049082 | A1* | 2/2018 | Kinthada Venkata ....................... H04W 36/302 |
| 2018/0287764 | A1* | 10/2018 | Hosseini ............... H04L 1/1822 |
| 2019/0182740 | A1* | 6/2019 | Gao ................ H04W 36/00837 |
| 2019/0306775 | A1* | 10/2019 | Duan .................... H04L 5/0051 |
| 2022/0022112 | A1* | 1/2022 | Lu .......................... H04W 40/12 |
| 2022/0330164 | A1* | 10/2022 | Thangarasa .......... H04W 24/10 |
| 2023/0247468 | A1* | 8/2023 | Zheng .................. H04L 5/0092 370/329 |

FOREIGN PATENT DOCUMENTS

| | | |
|---|---|---|
| CN | 108064055 A | 5/2018 |
| CN | 108632926 A | 10/2018 |
| CN | 110035464 A | 7/2019 |

OTHER PUBLICATIONS

Ericsson, "CHO for NTN LEO," 3GPP TSG-RAN WG2 #108, R2-1916393, Reno, USA, Nov. 18-22, 2019, 5 pages.
CATT, "Cell Selection and Reselection Issue in NTN System," 3GPP TSG-RAN WG2 Meeting #106, R2-1905873, Reno, USA, May 13-17, 2019, 3 pages.
Office Action in Chinese Appln. No. 202010085314.1, dated Nov. 26, 2021, 14 pages (with English translation).
International Search Report and Written Opinion in International Appln. No. PCT/CN2021/070347, mailed on Mar. 19, 2021, 17 pages (with English translation).

* cited by examiner

NETWORK RESOURCE CONFIGURATION METHOD AND APPARATUS

CROSS-REFERENCE TO RELATED APPLICATIONS

This application is a continuation of International Patent Application No. PCT/CN2021/070347, filed on Jan. 5, 2021, which claims priority to Chinese Patent Application No. 202010085314.1, filed on Feb. 10, 2020. The disclosures of the aforementioned applications are hereby incorporated by reference in their entireties.

TECHNICAL FIELD

This application relates to the field of communication technologies, and in particular, to a network resource configuration method and apparatus.

BACKGROUND

In non-terrestrial network (NTN) communication, when a terminal device is near an overlapping area of a plurality of serving cells, a cell currently accessed by the terminal device is referred to as a source cell. When the terminal device is about to enter another cellular cell from the source cell, a handover between access cells occurs, and a cell accessed by the terminal device after the handover may be referred to as a target cell. To improve the reliability of handover, a conditional handover (CHO) mechanism is introduced in the NTN system.

In the CHO mechanism, a source cell may send configuration information to a terminal device. The configuration information may include a CHO candidate cell and a CHO trigger condition. When detecting that a network status of any candidate cell meets the trigger condition, the terminal device may use the any candidate cell as a target cell. The trigger condition may be based on measurement of a reference signal received power (RSRP) or reference signal received quality (RSRQ) on a candidate cell, based on a location, a timer, a timing advance (TA), and the like. For example, when an RSRP or RSRQ parameter of a target cell meets a preset threshold, it is determined that the terminal device can be handed over to the target cell.

In an overlapping area of a source cell and a candidate cell, it is not entirely accurate to determine whether handover can be performed based on the trigger condition. For example, when a satellite works in a non-gaze mode, due to relative motion between a terminal device and the satellite, the overlapping area of the source cell and the candidate cell moves in real time. It is inaccurate to determine, based on a positioning location of the terminal device, whether the handover can be performed. Generally, based on the foregoing trigger conditions, an occasion when a terminal device needs to be handed over cannot be accurately determined, and successful trigger and completion of the CHO mechanism cannot be ensured.

SUMMARY

This application provides a network resource configuration method and apparatus, to resolve a problem in a conventional technology that a trigger condition of a CHO mechanism cannot accurately determine an occasion when a terminal device needs to be handed over, thereby improving accuracy and timeliness of the handover of the terminal device between communication cells.

To achieve the foregoing objectives, the following technical solutions are used in this application.

According to a first aspect, a network resource configuration method is provided. The method includes: A terminal device receives configuration information from a network device, where the configuration information includes first threshold information corresponding to at least one candidate cell, and a first threshold includes at least one of a Doppler frequency shift threshold, a timing advance TA rate threshold, or a Doppler frequency shift change rate threshold; the terminal device determines a target cell from the at least one candidate cell based on the configuration information; and the terminal device initiates a handover to the target cell.

In the foregoing technical solution, the terminal device receives the configuration information sent by the network device, and determines, based on the Doppler frequency shift threshold, the timing advance TA rate threshold, or the Doppler frequency shift change rate threshold corresponding to the at least one candidate cell included in the configuration information, the target cell that meets a handover condition from a plurality of candidate cells, and accurately performs the handover in time, thereby improving user experience.

In a possible implementation, a Doppler frequency shift indicates a Doppler frequency shift value between a signal sent by a network device of a candidate cell or a source cell and a signal received by the terminal device; a Doppler frequency shift change rate indicates a change in a Doppler frequency shift value corresponding to a candidate cell or a source cell in unit time; and a TA rate indicates a change in a TA value used by the terminal device to send a signal to a candidate cell or a source cell in unit time. In the foregoing possible implementation, in a mechanism for triggering communication cell switching, information about a frequency shift value and a frequency shift change rate caused by Doppler effect, or a TA rate is considered, improving accuracy of the trigger mechanism.

In a possible implementation, the first threshold information includes the first threshold or an index number corresponding to the first threshold. In the foregoing possible implementation, the first threshold information may be in a form of a specific numeric value or the index number of the first threshold. The first threshold is obtained based on the index number, avoiding frequent sending of configuration information and saving configuration signaling.

In a possible implementation, the first threshold information includes intermediate information for calculating the first threshold, and the intermediate information includes coordinate information of a reference point in an overlapping area of a source cell and a candidate cell of the terminal device, or the intermediate information includes an included angle between a satellite motion direction and the reference point of the overlapping area. In the foregoing possible implementation, the first threshold is obtained by using the intermediate information, so that the target cell that meets the handover condition can be determined based on the first threshold, and the handover is accurately performed in time, thereby improving user experience.

In a possible implementation, if the intermediate information includes the included angle, and the first threshold is the Doppler frequency shift threshold, a formula for calculating the Doppler frequency shift threshold is:

$$D = f_d \frac{V \cdot \cos(\alpha) + V_{UE}}{c},$$

where D represents the Doppler frequency shift threshold, V represents a moving speed of the satellite, $V_{UE}$ represents a moving speed of the terminal device, c represents the speed of light, $f_d$ represents a frequency at which the network device of the candidate cell or the source cell sends a signal to the terminal device, and α represents the included angle; and if the intermediate information includes the included angle, and the first threshold is the TA rate threshold, a formula for calculating the TA rate threshold includes:

$$TAR = -\frac{2[V \cdot \cos(\alpha) + V_{UE}]}{c},$$

where TAR represents the TA rate threshold. In the foregoing possible implementation, the first threshold is obtained by using the intermediate information and the preset calculation formula, so that the target cell that meets the handover condition can be determined based on the first threshold, and the handover is accurately performed in time, thereby improving user experience.

In a possible implementation, the configuration information further includes a second threshold. The second threshold includes at least one of the following thresholds: a reference signal received power RSRP threshold, a signal-to-noise ratio SNR threshold, a bit energy-to-noise power spectral density ratio threshold, a channel quality indicator CQI threshold, a signal-to-interference-plus-noise ratio SINR threshold, or a reference signal received quality RSRQ threshold. In the foregoing possible implementation, the trigger condition configured for the terminal device may further include information about the RSRP threshold, RSRQ threshold, or the like, so that the trigger mechanism is dually verified to determine the target cell that meets the handover condition, and the handover is accurately performed in time, thereby improving user experience.

In a possible implementation, the configuration information further includes indication information, and the indication information indicates a first determining condition when the first threshold is used to determine the target cell and a second determining condition when the second threshold is used to determine the target cell. In the foregoing possible implementation, because the determining condition for the first threshold or the second threshold is not fixed, the configuration information may further include a specific determining condition for the first threshold or the second threshold, to accurately determine a candidate cell and determine whether the handover condition is met.

In a possible implementation, if the second threshold is the RSRP threshold, the second determining condition is that an RSRP of any candidate cell is greater than or equal to the RSRP threshold. In the foregoing possible implementation, the configuration information may further include the determining condition for the second threshold, so that a candidate cell can be determined accurately based on the determining condition for the second threshold, thereby improving switching accuracy.

In a possible implementation, that the terminal device determines a target cell from the at least one candidate cell based on the configuration information includes: If the terminal device determines that one or more candidate cells meet a first determining condition for the first threshold of the candidate cell and meets a second determining condition for the second threshold of the candidate cell, the terminal device determines that the one or more candidate cells meet a handover condition; and determines the target cell from the one or more candidate cells that meet the handover condition. In the foregoing possible implementation, it is determined that the one or more candidate cells meet both the first determining condition for the first threshold and the second determining condition for the second threshold, so that the trigger mechanism is dually verified to determine the target cell that meets the handover condition, and the handover is accurately performed in time, thereby improving user experience.

In a possible implementation, when it is determined that a relative distance between the terminal device and a satellite gradually decreases, if the first threshold of the candidate cell is a Doppler frequency shift threshold, the first determining condition is that the Doppler frequency shift of the candidate cell is greater than or equal to the Doppler frequency shift threshold; if the first threshold of the candidate cell is a Doppler frequency shift change rate threshold, the first determining condition is that the Doppler frequency shift change rate of the candidate cell is less than or equal to the Doppler frequency shift change rate threshold; or if the first threshold of the candidate cell is a TA rate threshold, the first determining condition is that the TA rate of the candidate cell is greater than or equal to the TA rate threshold. In the foregoing possible implementation, when the relative distance between the terminal device and the satellite gradually decreases, the target cell may be determined based on the first threshold of the candidate cell and the first determining condition, and the cell switching mechanism is accurately triggered in time, thereby improving user experience.

In a possible implementation, when it is determined that a relative distance between the terminal device and a satellite gradually increases, if the first threshold of the candidate cell is a Doppler frequency shift threshold, the first determining condition is that a Doppler frequency shift of any candidate cell is less than or equal to the Doppler frequency shift threshold; if the first threshold of the candidate cell is a Doppler frequency shift change rate threshold, the first determining condition is that a Doppler frequency shift change rate of any candidate cell is greater than or equal to the Doppler frequency shift change rate threshold; or if the first threshold of the candidate cell is a TA rate threshold, the first determining condition is that a TA rate of any candidate cell is greater than or equal to the TA rate threshold. In the foregoing possible implementation, when the relative distance between the terminal device and the satellite gradually increases, the target cell may be determined based on the first threshold of the candidate cell and the first determining condition, and the cell switching mechanism is accurately triggered in time, thereby improving user experience.

In a possible implementation, the configuration information further includes priority information corresponding to a plurality of candidate cells, and the priority information is related to at least one of duration of the terminal device camping on a candidate cell, signal strength of a candidate cell received by the terminal device, or a quantity of terminal devices that have accessed a candidate cell. In the foregoing possible implementation, the configuration information may further include the priority information of the plurality of candidate cells, so that factors such as the duration of the terminal device camping on the candidate cell, the signal strength of the candidate cell received by the terminal device, or the quantity of terminal devices that have accessed the candidate cell may be comprehensively considered for triggering the switching mechanism, improving switching accuracy and improving user experience.

In a possible implementation, that the terminal device determines a target cell from the at least one candidate cell based on the configuration information includes: The terminal device determines a candidate cell with a highest priority as the target cell based on priority information corresponding to the at least one candidate cell. In the foregoing possible implementation, the terminal device may determine the target cell based on the priority information of the plurality of candidate cells, thereby improving accuracy of the switching mechanism and improving user experience.

In a possible implementation, the configuration information is carried in at least one of the following messages: a radio resource control RRC message, a system information block SIB1, other system information OSI, a master information block MIB, downlink control information DCI, group DCI information, medium access control MAC information, or a timing advance command TAC. In the foregoing possible implementation, the configuration information sent by the network device to the terminal device may be carried in the foregoing multiple types of signaling, or carried in service data of a user, thereby reducing information overheads and improving user experience.

According to a second aspect, a network resource configuration method is provided. The method includes: A network device obtains first threshold information corresponding to at least one candidate cell, where the first threshold includes at least one of a Doppler frequency shift threshold, a timing advance TA rate threshold, or a Doppler frequency shift change rate threshold; and the network device sends configuration information to a terminal device, where the configuration information includes the first threshold information corresponding to the at least one candidate cell, and the configuration information is used by the terminal device to determine a target cell from a plurality of candidate cells based on the configuration information.

In a possible implementation, a Doppler frequency shift indicates a Doppler frequency shift value between a signal sent by a network device of a candidate cell or a source cell and a signal received by the terminal device; a Doppler frequency shift change rate indicates a change in a Doppler frequency shift value corresponding to a candidate cell or a source cell in unit time; and a TA rate indicates a change in a TA value used by the terminal device to send a signal to a candidate cell or a source cell in unit time.

In a possible implementation, the first threshold information includes the first threshold or an index number corresponding to the first threshold.

In a possible implementation, the first threshold information includes intermediate information for calculating the first threshold, and the intermediate information includes coordinate information of a reference point in an overlapping area of a source cell and a candidate cell of the terminal device, or the intermediate information includes an included angle between a satellite motion direction and the reference point of the overlapping area.

In a possible implementation, if the intermediate information includes the included angle, and the first threshold is the Doppler frequency shift threshold, a formula for calculating the Doppler frequency shift threshold is:

$$D = f_d \frac{V \cdot \cos(\alpha) + V_{UE}}{c},$$

where D represents the Doppler frequency shift threshold, V represents a moving speed of the satellite, $V_{UE}$ represents a moving speed of the terminal device, c represents the speed of light, $f_d$ represents a frequency at which the network device of the candidate cell or the source cell sends a signal to the terminal device, and $\alpha$ represents the included angle; and if the intermediate information includes the included angle, and the first threshold is the TA rate threshold, a formula for calculating the TA rate threshold includes:

$$TAR = -\frac{2[V \cdot \cos(\alpha) + V_{UE}]}{c},$$

where TAR represents the TA rate threshold.

In a possible implementation, the configuration information further includes a second threshold. The second threshold includes at least one of the following thresholds: a reference signal received power RSRP threshold, a signal-to-noise ratio SNR threshold, a bit energy-to-noise power spectral density ratio threshold, a channel quality indicator CQI threshold, a signal-to-interference-plus-noise ratio SINR threshold, or a reference signal received quality RSRQ threshold.

In a possible implementation, the configuration information further includes indication information, and the indication information indicates a first determining condition when the first threshold is used to determine the target cell and a second determining condition when the second threshold is used to determine the target cell.

In a possible implementation, if the second threshold is the RSRP threshold, the second determining condition is that an RSRP of any candidate cell is greater than or equal to the RSRP threshold.

In a possible implementation, the configuration information further includes priority information corresponding to a plurality of candidate cells, and the priority information is related to at least one of duration of the terminal device camping on a candidate cell, signal strength of a candidate cell received by the terminal device, or a quantity of terminal devices that have accessed a candidate cell.

In a possible implementation, the priority information is used by the terminal device to determine a candidate cell with a highest priority from the at least one candidate cell as the target cell.

In a possible implementation, the configuration information is carried in at least one of the following messages: a radio resource control RRC message, a system information block SIB1, other system information OSI, a master information block MIB, downlink control information DCI, group DCI information, medium access control MAC information, or a timing advance command TAC.

According to a third aspect, a network resource configuration apparatus is provided. The apparatus includes: a receiving unit, configured to receive configuration information from a network device, where the configuration information includes first threshold information corresponding to at least one candidate cell, and a first threshold includes at least one of a Doppler frequency shift threshold, a timing advance TA rate threshold, or a Doppler frequency shift change rate threshold; a processing unit, configured to determine a target cell from the at least one candidate cell based on the configuration information; and a sending unit, configured to initiate a handover to the target cell.

In a possible implementation, a Doppler frequency shift indicates a Doppler frequency shift value between a signal sent by a network device of a candidate cell or a source cell and a signal received by the terminal device; a Doppler frequency shift change rate indicates a change in a Doppler frequency shift value corresponding to a candidate cell or a source cell in unit time; and a TA rate indicates a change in a TA value used by the terminal device to send a signal to a candidate cell or a source cell in unit time.

In a possible implementation, the first threshold information includes the first threshold or an index number corresponding to the first threshold.

In a possible implementation, the first threshold information includes intermediate information for calculating the first threshold, and the intermediate information includes coordinate information of a reference point in an overlapping area of a source cell and a candidate cell of the terminal device, or the intermediate information includes an included angle between a satellite motion direction and the reference point of the overlapping area.

In a possible implementation, if the intermediate information includes the included angle, and the first threshold is the Doppler frequency shift threshold, a formula for calculating the Doppler frequency shift threshold is:

$$D = f_d \frac{V \cdot \cos(\alpha) + V_{UE}}{c},$$

where D represents the Doppler frequency shift threshold, V represents a moving speed of the satellite, $V_{UE}$ represents a moving speed of the terminal device, c represents the speed of light, $f_d$ represents a frequency at which the network device of the candidate cell or the source cell sends a signal to the terminal device, and $\alpha$ represents the included angle; and if the intermediate information includes the included angle, and the first threshold is the TA rate threshold, a formula for calculating the TA rate threshold includes:

$$TAR = -\frac{2[V \cdot \cos(\alpha) + V_{UE}]}{c},$$

where TAR represents the TA rate threshold.

In a possible implementation, the configuration information further includes a second threshold. The second threshold includes at least one of the following thresholds: a reference signal received power RSRP threshold, a signal-to-noise ratio SNR threshold, a bit energy-to-noise power spectral density ratio threshold, a channel quality indicator CQI threshold, a signal-to-interference-plus-noise ratio SINR threshold, or a reference signal received quality RSRQ threshold.

In a possible implementation, the configuration information further includes indication information, and the indication information indicates a first determining condition when the first threshold is used to determine the target cell and a second determining condition when the second threshold is used to determine the target cell.

In a possible implementation, if the second threshold is the RSRP threshold, the second determining condition is that an RSRP of any candidate cell is greater than or equal to the RSRP threshold.

In a possible implementation, the processing unit is configured for the following: If the terminal device determines that one or more candidate cells meet a first determining condition for the first threshold of the candidate cell and meets a second determining condition for the second threshold of the candidate cell, the terminal device determines that the one or more candidate cells meet a handover condition, and determines the target cell from the candidate cell that meets the handover condition.

In a possible implementation, the processing unit is configured for the following: When it is determined that a relative distance between the terminal device and a satellite gradually decreases, if the first threshold of the candidate cell is a Doppler frequency shift threshold, the first determining condition is that the Doppler frequency shift of the candidate cell is greater than or equal to the Doppler frequency shift threshold; if the first threshold of the candidate cell is a Doppler frequency shift change rate threshold, the first determining condition is that the Doppler frequency shift change rate of the candidate cell is less than or equal to the Doppler frequency shift change rate threshold; or if the first threshold of the candidate cell is a TA rate threshold, the first determining condition is that the TA rate of the candidate cell is greater than or equal to the TA rate threshold.

In a possible implementation, the processing unit is configured for the following: When it is determined that a relative distance between the terminal device and a satellite gradually increases, if the first threshold of the candidate cell is a Doppler frequency shift threshold, the first determining condition is that a Doppler frequency shift of any candidate cell is less than or equal to the Doppler frequency shift threshold; if the first threshold of the candidate cell is a Doppler frequency shift change rate threshold, the first determining condition is that a Doppler frequency shift change rate of any candidate cell is greater than or equal to the Doppler frequency shift change rate threshold; or if the first threshold of the candidate cell is a TA rate threshold, the first determining condition is that a TA rate of any candidate cell is greater than or equal to the TA rate threshold.

In a possible implementation, the configuration information further includes priority information corresponding to a plurality of candidate cells, and the priority information is related to at least one of duration of the terminal device camping on a candidate cell, signal strength of a candidate cell received by the terminal device, or a quantity of terminal devices that have accessed a candidate cell.

In a possible implementation, the processing unit is configured for the following: The terminal device determines a candidate cell with a highest priority as the target cell based on the priority information corresponding to the at least one candidate cell.

In a possible implementation, the configuration information is carried in at least one of the following messages: an RRC message, a system information block SIB1, other system information OSI, a master information block MIB, downlink control information DCI, group DCI information, medium access control MAC information, or a timing advance command TAC.

According to a fourth aspect, a network resource configuration apparatus is provided. The apparatus includes: a processing unit, configured to obtain first threshold information corresponding to at least one candidate cell, where the first threshold includes at least one of a Doppler frequency shift threshold, a timing advance TA rate threshold, or a Doppler frequency shift change rate threshold; and a sending unit, configured to send configuration information to a terminal device, where the configuration information includes the first threshold information corresponding to the at least one candidate cell, and the configuration information is used by the terminal device to determine a target cell from a plurality of candidate cells based on the configuration information.

In a possible implementation, a Doppler frequency shift indicates a Doppler frequency shift value between a signal sent by a network device of a candidate cell or a source cell and a signal received by the terminal device; a Doppler frequency shift change rate indicates a change in a Doppler frequency shift value corresponding to a candidate cell or a source cell in unit time; and a TA rate indicates a change in a TA value used by the terminal device to send a signal to a candidate cell or a source cell in unit time.

In a possible implementation, the first threshold information includes the first threshold or an index number corresponding to the first threshold.

In a possible implementation, the first threshold information includes intermediate information for calculating the first threshold, and the intermediate information includes coordinate information of a reference point in an overlapping area of a source cell and a candidate cell of the terminal device, or the intermediate information includes an included angle between a satellite motion direction and the reference point of the overlapping area.

In a possible implementation, if the intermediate information includes the included angle, and the first threshold is the Doppler frequency shift threshold a formula for calculating the Doppler frequency shift threshold is:

$$D = f_d \frac{V \cdot \cos(\alpha) + V_{UE}}{c},$$

where D represents the Doppler frequency shift threshold, V represents a moving speed of the satellite, $V_{UE}$ represents a moving speed of the terminal device, c represents the speed of light, $f_d$ represents a frequency at which the network device of the candidate cell or the source cell sends a signal to the terminal device, and $\alpha$ represents the included angle; and if the intermediate information includes the included angle, and the first threshold is the TA rate threshold, a formula for calculating the TA rate threshold includes:

$$TAR = -\frac{2[V \cdot \cos(\alpha) + V_{UE}]}{c},$$

where TAR represents the TA rate threshold.

In a possible implementation, the configuration information further includes a second threshold. The second threshold includes at least one of the following thresholds: a reference signal received power RSRP threshold, a signal-to-noise ratio SNR threshold, a bit energy-to-noise power spectral density ratio threshold, a channel quality indicator CQI threshold, a signal-to-interference-plus-noise ratio SINR threshold, or a reference signal received quality RSRQ threshold.

In a possible implementation, the configuration information further includes indication information, and the indication information indicates a first determining condition when the first threshold is used to determine the target cell and a second determining condition when the second threshold is used to determine the target cell.

In a possible implementation, if the second threshold is the RSRP threshold, the second determining condition is that an RSRP of any candidate cell is greater than or equal to the RSRP threshold.

In a possible implementation, the configuration information further includes priority information corresponding to a plurality of candidate cells, and the priority information is related to at least one of duration of the terminal device camping on a candidate cell, signal strength of a candidate cell received by the terminal device, or a quantity of terminal devices that have accessed a candidate cell.

In a possible implementation, the priority information is used by the terminal device to determine a candidate cell with a highest priority from the at least one candidate cell as the target cell.

In a possible implementation, the configuration information is carried in at least one of the following messages: an RRC message, a system information block SIB1, other system information OSI, a master information block MIB, downlink control information DCI, group DCI information, medium access control MAC information, or a timing advance command TAC.

According to a fifth aspect, a communication apparatus is provided. The communication apparatus includes a processor, and the processor is coupled to a memory. The memory is configured to store a computer program or instructions, and the processor is configured to execute the computer program or instructions stored in the memory, so that the communication apparatus is enabled to perform the method according to any one of the first aspect.

According to a sixth aspect, a communication apparatus is provided. The communication apparatus includes a processor, and the processor is coupled to a memory. The memory is configured to store a computer program or instructions, and the processor is configured to execute the computer program or instructions stored in the memory, so that the communication apparatus is enabled to perform the method according to any one of the second aspect.

According to a seventh aspect, a communication system is provided. The communication system includes the apparatus according to any one of the third aspect and the apparatus according to any one of the fourth aspect.

According to an eighth aspect, a computer-readable storage medium is provided, including a program or instructions. When the program or instructions is or are executed by a processor, the computer or the processor is enabled to perform the method according to any one of the first aspect.

According to a ninth aspect, a computer program product is provided. When the computer program product runs on a computer, the computer is enabled to perform the method according to any one of the first aspect.

According to a tenth aspect, a communication system is provided. The communication system includes the communication apparatus according to any one of the fifth aspect and the apparatus according to any one of the sixth aspect.

According to an eleventh aspect, a chip is provided. The chip includes an input interface, a logic circuit, and an output interface. The input interface is configured to input received data; the logic circuit is configured to process the data received by the input interface in the method according to any one of the first aspect; and the output interface is configured to output the data processed by the logic circuit.

For technical problems to be solved and technical effects brought by the network resource configuration apparatus, the communication system, the communication apparatus, the computer-readable storage medium, the computer program product, and the chip provided in this application, refer to the content described in any one of the first aspect. Details are not described herein again.

It should be understood that the foregoing general descriptions and the following detailed descriptions are only examples and explanatory, and do not limit this application.

DESCRIPTION OF EMBODIMENTS

In the specification, claims, and accompanying drawings of this application, the terms "first", "second", "third" and the like are intended to distinguish different objects but do not limit a particular sequence. In addition, in embodiments of this application, the word "example" or "for example" is used to represent giving an example, an illustration, or a description. Any embodiment or design scheme described as an "example" or with "for example" in embodiments of this application should not be explained as being more preferred or having more advantages than another embodiment or design scheme. Exactly, use of the word "example" or "for example" is intended to present a related concept in a specific manner.

The following clearly and describes the technical solutions in the embodiments of this application with reference to the accompanying drawings in the embodiments of this application. It is clear that the described embodiments are merely some but not all of the embodiments of this application. All other embodiments obtained by a person of ordinary skill in the art based on embodiments of this application without creative efforts shall fall within the protection scope of this application.

Technical solutions in embodiments of this application may be applied to an NTN communication system. The following describes the technical solutions in this application with reference to accompanying drawings.

Non-terrestrial network NTN communication is a deployment scenario of non-terrestrial networks, including satellite networks, defined in the research on new air interface technologies of the fifth generation mobile communication technology (5th Generation Wireless Systems, 5G). With the help of wide coverage capabilities of satellites, 5G communication services are implemented. An NTN can cover an application scenario together with a terrestrial network and serve as an enhancement of terrestrial network coverage (such as sea or high-speed railway), and can also independently provide a unique communication service for isolated islands, remote areas, and aerospace equipment. Particularly, the NTN plays a role in scenarios such as emergency communication, maritime communication, and railway communication. Broadcast or multicast services may also be directly provided for network edges or terminal devices, thereby greatly enhancing the scalability of a 5G network and implementing 5G service continuity.

Figure 1:
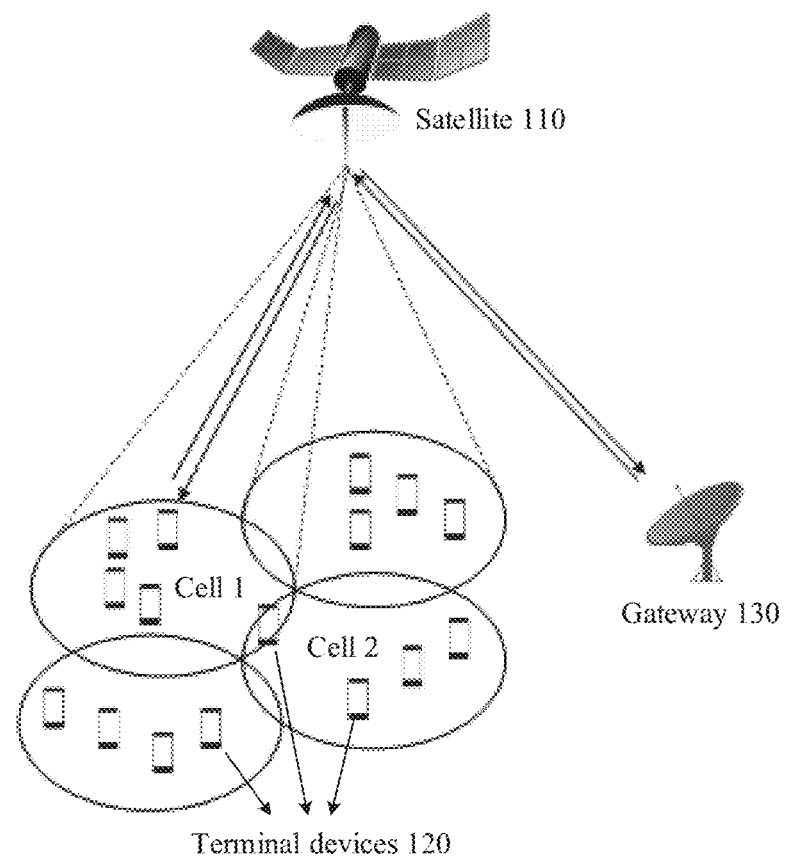
FIG. 1 is a schematic diagram depicting an architecture of a communication system according to an embodiment of this application.

For ease of understanding of embodiments of this application, an NTN communication system applicable to embodiments of this application is described with reference to FIG. 1. FIG. 1 shows a schematic diagram depicting an architecture of an NTN communication system applicable to an embodiment of this application; As shown in FIG. 1, an NTN communication system 100 may include at least one network device, for example, a satellite 110 shown in FIG. 1. The communication system 100 may further include at least one terminal device, for example, a terminal device 120 shown in FIG. 1. The satellite 110 may communicate with the terminal device 120 through a radio link.

It should be understood that the network device in the wireless communication system may be any device that has a wireless transceiver function. The device includes but is not limited to a base station controller (BSC), a base transceiver station (BTS), and the like. The device may further be an antenna panel or a group of antenna panels (including a plurality of antenna panels) of a base station in a 5G system, a device serving as a base station in device-to-device communication (D2D), machine communication, or vehicle-to-everything communication, a satellite, a base station in a future communication system, or the like.

The following describes in detail the technical solutions of this application by using a satellite communication system as an example.

The satellite communication system may include at least one satellite communication device, such as the network device shown in FIG. 1. For example, the network device may be the satellite 110. The satellite communication system may further include at least one terminal device, such as the 120 shown in FIG. 1.

The satellite 110 may be an artificial earth satellite serving as a radio communication relay station. The satellite 110 implements radio communication between the satellite and earth stations or between earth stations and a spacecraft by relaying radio signals. The satellite 110 may transmit information of a telephone, a telegram, a fax, data, a television, and the like.

The satellite 110 may work in a transparent transmission mode or a regeneration mode. When the satellite 110 works in the transparent transmission mode, the satellite 110, serving as a relay forwarding device, may forward a signal of another network device or the terminal device 120. This may be used as enhanced processing for terrestrial network coverage. When the satellite 110 works in the regeneration mode, the satellite 110 has a signal processing capability, and can send a signal to another network device or the terminal device 120, to directly provide a communication service to the terminal device 120. For example, as shown in FIG. 1, the satellite 110 may cover communication in a cell 1, a cell 2, and the like, and provide communication services to terminal devices located in the cell 1 and the cell 2. However, when a terminal device is located in an overlapping area of the cell 1 and the cell 2, a handover process described in this embodiment of this application occurs. The handover is a process in which a terminal device moves in a service state and is handed over to another serving cell. A process in which a terminal device moves in an idle state and is handed over to another serving cell is referred to as "cell reselection".

In addition, the satellite 110 may work in a gaze mode or a non-gaze mode. The gaze mode means that with the motion of the satellite 110, a coverage area radiated by communication signals of the satellite remains unchanged by changing a radiation angle when the satellite sends the communication signals. The non-gaze mode means that the radiation angle of the satellite 110 remains unchanged as the satellite 110 moves, and the coverage area of the communication signals radiation changes in real time as the satellite moves.

It should be understood that the terminal device 120 may also be referred to as an access terminal device, a subscriber unit, a subscriber station, a mobile station, a mobile console, a remote station, a remote terminal device, a mobile device, user equipment (UE), a terminal device, a wireless communication device, a user agent, or a user apparatus. The UE in embodiments of this application may be a mobile phone, a smart watch, a tablet computer (pad), a computer with a wireless transceiver function, a virtual reality (VR) terminal device, an augmented reality (AR) terminal device, a wireless terminal device in industrial control, a wireless terminal device in self driving, a wireless terminal device in remote medical, a wireless terminal device in a smart grid, a wireless terminal device in transportation safety, a wireless terminal device in a smart city, a wireless terminal device in a smart home, a vehicle-mounted terminal in vehicle-to-everything, and the like. An application scenario is not limited in embodiments of this application.

As shown in FIG. 1, the communication system may further include a gateway 130. The gateway 130 may provide communication services for a network device, for example, for a beam coverage area of a satellite. As a management, switching and control center of a non-terrestrial communication system, a gateway is responsible for processing such as signal access, user authentication management, service admission control and data exchange in an NTN system.

In addition, as a network device, the gateway 130 may be configured to connect to a core network. When the satellite 110 works in the transparent transmission mode, the satellite 110 may serve as a relay forwarding device between the gateway 130 and the terminal device 120, and is configured to forward a communication signal between the gateway 130 and the terminal device 120.

In NTN communication, a mechanism in which a terminal device performs a handover between coverage cells of the NTN communication may include the following steps.

1. A network device sends measurement configuration information to a terminal device, and the terminal device sends a measurement report to the network device based on the measurement configuration information.

The network device indicates a network device of a source cell of the terminal device, and the source cell is a current access cell of the terminal device. The measurement configuration information is information detected by the terminal device about a time-frequency resource of a downlink signal of a neighbor cell of the source cell. In addition, the measurement configuration information may further include time-frequency resource information for the terminal device to send the measurement report to the network device. The measurement report may include information such as signal strength or signal quality of the neighboring cell detected by the terminal device.

2. The network device determines whether the terminal device can use a conditional switching mechanism, and if the terminal device can use the conditional switching mechanism, the following steps are performed.

The network device of the source cell may determine whether the UE can use a conditional handover (CHO) based on the measurement report and radio resource management (RRM) information reported by the terminal device, and the conditional switching mechanism. The conditional switching mechanism is a determining manner configured by the network device and used to determine whether a neighboring cell meets a handover condition.

3. The network device of the source cell sends a CHO request message to at least one candidate cell.

The candidate cell is a neighboring cell of the source cell of the terminal device.

4. The at least one candidate cell determines whether to allow the terminal device to access the candidate cell.

Whether access of the terminal device can be further admitted may be determined based on, for example, a quantity of terminal devices that have accessed the candidate cell.

If the candidate cell determines to access the terminal device, the following steps are performed.

5. A network device of a candidate cell sends CHO request acknowledgment information to the network device of the source cell.

The CHO request acknowledgment information is used to report a CHO handover request to the network device, and the CHO request acknowledgment information includes related configuration of the at least one candidate cell, for example, configuration information such as an ID of a candidate cell.

6. The network device of the source cell sends configuration information to the terminal device, and the configuration information may include a candidate cell list and an execution condition of a CHO corresponding to the at least one candidate cell.

The candidate cell list is information about a communication cell to which the terminal device can be handed over. For example, the candidate cell list may be a cell 1, a cell 2, and a cell 3. For example, the configuration information may be carried in an RRC message, for example, an RRCReconfiguration message.

7. The terminal device sends an acknowledgment message to the network device of the source cell.

For example, the acknowledgment message may be an RRCReconfigurationComplete message.

8. The terminal device determines whether the at least one candidate cell meets the CHO execution condition, and determines a target cell.

The terminal device may maintain a connection to the source cell, and simultaneously determine whether one or more candidate cells meet the CHO execution condition. If the terminal device detects that any candidate cell meets a corresponding CHO execution condition, the terminal device determines that the candidate cell is the target cell. The terminal device may disconnect from the network device of the source cell, determine the candidate cell as the target cell by using the stored configuration information of the candidate cell, and send RRCReconfigurationComplete information to the network device of the target cell to complete a conditional handover acknowledgment process.

In the conventional technology, the CHO execution condition in the configuration information includes a determining condition based on reference signal received power (RSRP) or reference signal received quality (RSRQ), based on a location, based on a timer, based on a TA value, and the like. However, these determining conditions are not accurate or have defects of varying degrees. Therefore, the handover cannot be accurately triggered in time.

In view of this, this application provides a network resource configuration method applicable to NTN communication. Configuration information sent by a network device to a to-be-handed over terminal device carries information about a Doppler frequency shift threshold, a timing advance TA rate threshold, or a Doppler frequency shift change rate threshold of a candidate cell, so that the terminal device determines a target cell that meets the handover condition based on the thresholds, and initiates a handover to the target cell.

Figure 2:
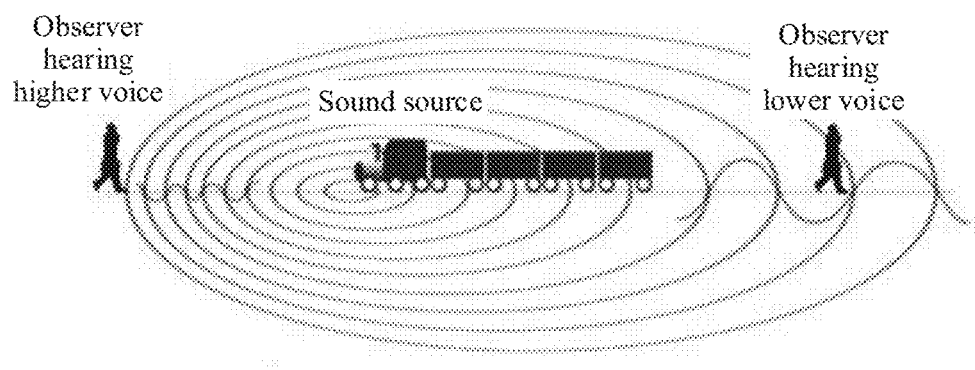
FIG. 2 is a schematic diagram of a principle of the Doppler effect.

It should be noted that Doppler refers to Doppler effect, and is a phenomenon in which a wavelength radiated by an object changes due to relative motion of a wave source and an observer. FIG. 2 shows an example in which a radiated signal is a sound wave signal. Due to the relative motion between a sound source and an observer, the sound wave signal received by the observer changes, that is, a frequency of the sound wave signal received by a receiver is different from a frequency of a wave source. This is a frequency shift phenomenon. When the sound source is away from the observer, a wavelength of the sound wave signal increases, the frequency received by the observer becomes lower, and the sound heard by the observer becomes lower. As the sound source approaches the observer, the wavelength of the sound wave signal decreases, the frequency received by the observer becomes higher, and the sound heard by the observer becomes higher.

Similarly, in mobile communication, when a terminal device moves toward a network device (for example, a satellite), a frequency of a signal received by the terminal device gradually increases, and when the terminal device is away from the network device, a frequency of a signal received by the terminal device gradually decreases. Therefore, frequency shift caused by the Doppler effect should be fully considered in mobile communication. In embodiments of this application, a frequency shift value generated by the Doppler effect is referred to as a Doppler frequency shift, a Doppler frequency offset or Doppler for short. The Doppler frequency shift value is related to a ratio of a relative speed between the network device (for example, a satellite) and the terminal device to a speed of sound.

Figure 3:
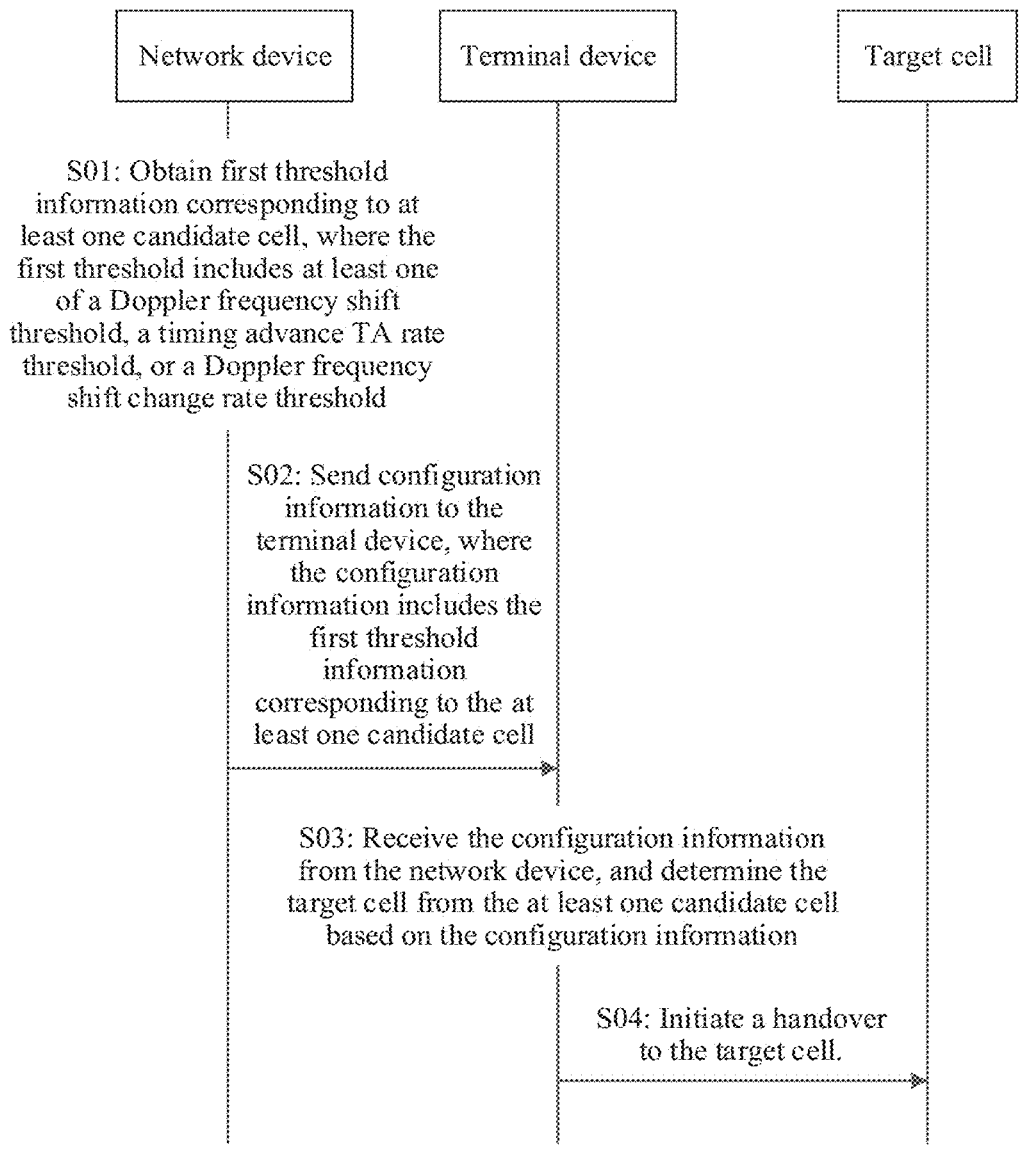
FIG. 3 is a flowchart of a network resource configuration method according to an embodiment of this application.

The following describes embodiments of this application in detail with reference to the accompanying drawings. As shown in FIG. 3, the method may include the following steps.

S01: The network device obtains first threshold information corresponding to at least one candidate cell, where the first threshold includes at least one of a Doppler frequency shift threshold, a timing advance (TA) rate threshold, or a Doppler frequency shift change rate threshold.

For one terminal device, there may be one or more candidate cells for handover. The first threshold information corresponding to the candidate cells may be the same or may be different. When there is one candidate cell, the network device sends, to the candidate cell, the first threshold information corresponding to the candidate cell. When there are a plurality of candidate cells, the network device separately sends the first threshold information corresponding to the plurality of candidate cells.

Figure 4:
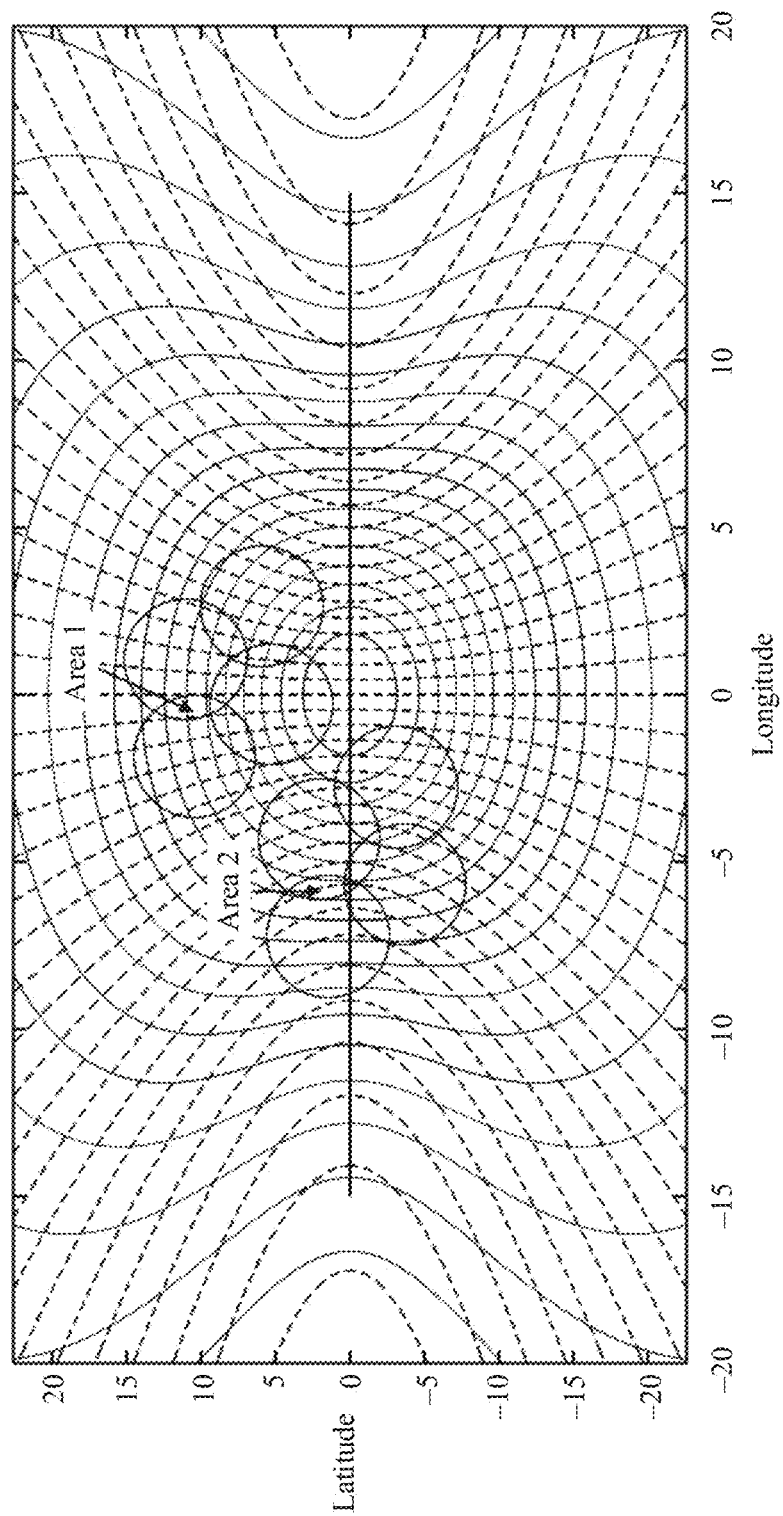
FIG. 4 is a schematic diagram of a principle of a network resource configuration method according to an embodiment of this application.

It should be noted that a Doppler frequency shift indicates a Doppler frequency shift value between a signal sent by a network device of a candidate cell or a source cell and a signal received by the terminal device. As shown in FIG. 4, a dashed line in the figure is a Doppler contour line, and represents positions with same Doppler frequency shift values, that is, Doppler frequency shift values at any position on one Doppler contour line are the same.

A Doppler frequency shift change rate indicates a change in a Doppler frequency shift value corresponding to a candidate cell or a source cell in unit time. As shown in FIG. 4, a solid line in the figure is a Doppler change rate contour line, and represents positions with same Doppler frequency shift change rates, that is, Doppler frequency shift change rates on any Doppler change rate contour line are the same.

A TA rate indicates a change in a TA value used by the terminal device to send a signal to a candidate cell or a source cell in unit time. The TA rate threshold is related to a positive or negative TA rate, and is related to relative motion between UE and a satellite. Therefore, a value relationship between the TA rate and the threshold is related to a relative position between the UE and the satellite.

The Doppler frequency shift value, the Doppler frequency shift change rate, or the TA rate may be obtained by detecting a downlink broadcast signal of the source cell, or may be obtained by detecting a downlink broadcast signal of a candidate cell.

In some implementations, the first threshold information may include the first threshold, for example, at least one of a Doppler frequency shift threshold, a timing advance (TA) rate threshold, or a Doppler frequency shift change rate threshold. The first threshold information may include an index number corresponding to the first threshold, so that the terminal device may perform query based on the index number to obtain the first threshold corresponding to the index number. Alternatively, the first threshold information may further include intermediate information for calculating the first threshold, so that the terminal device can obtain the first threshold based on the intermediate information and a preset calculation formula.

Specific manners of representing and obtaining the first threshold information are described in detail below, and details are not described herein again.

S02: The network device sends configuration information to the terminal device, where the configuration information includes the first threshold information corresponding to the at least one candidate cell.

The network device sends the configuration information to the terminal device, so that the terminal device determines a target cell from the at least one candidate cell based on the configuration information. The configuration information may include the first threshold information corresponding to the at least one candidate cell.

In a possible implementation, the configuration information may be carried in at least one of the following messages: a radio resource control (RRC) message, a system information block (SIB) 1, other system information (OSI), master information block (MIB), downlink control information (DCI), group DCI information, medium access control (MAC) information, a timing advance (TAC), or the like. Alternatively, the configuration information may be sent together with data transmission, or the configuration information may be carried in a separately allocated physical downlink shared channel (PDSCH).

For example, the configuration information may be carried in an RRC message. An RRCReconfiguration message sent by the network device to the terminal device. The message includes the first threshold information corresponding to the at least one candidate cell. The following embodiments of this application are described using this as an example. This is not specifically limited herein.

S03: The terminal device receives the configuration information from the network device, and determines the target cell from the at least one candidate cell.

The terminal device obtains the first threshold information corresponding to the at least one candidate cell based on the received configuration information, and filters and obtains a candidate cell that meets a determining manner of the first threshold, that is, determines the target cell from the at least one candidate cell. For example, a Doppler frequency shift threshold of a candidate cell 1 received by the terminal device is D_threshold, and the terminal device may detect a Doppler frequency shift value Doppler of the current candidate cell 1. According to a preset determining manner, when detecting that Doppler is greater than or equal to D_threshold, the terminal device determines that the candidate cell 1 meets the handover condition, and the candidate cell 1 is the target cell. When detecting that the Doppler is less than D_threshold, the terminal device determines that the candidate cell 1 does not meet the handover condition.

S04: The terminal device initiates a handover to the target cell.

In an implementation, after determining the target cell, the terminal device may disconnect from communication with the network device of the source cell, synchronize with the target cell based on the stored configuration information of the corresponding target cell, and send acknowledgment information to the network device of the target cell, for example, send RRCReconfigurationComplete information, to complete a conditional handover acknowledgment process.

In the foregoing embodiment of this application, the network device sends the configuration information to the terminal device, where the configuration information includes a Doppler frequency shift threshold, a timing advance TA rate threshold, or a Doppler frequency shift change rate threshold corresponding to the at least one candidate cell, so that the terminal device may determine, from the plurality of candidate cells, the target cell that meets the handover condition based on the thresholds, and the handover is accurately performed in time, thereby improving user experience.

In an implementation, different cells or beams may be distinguished in a communication protocol based on a bandwidth part (BWP), a transmission configuration indicator (TCI), or a synchronization signal block (SSB). In other words, a cell or a beam may be indicated by using configuration of a BWP, a TCI, or an SSB. For example, for the network device and the terminal device, switching of beams or cells may be indicated by switching of BWPs, TCIs, or SSBs. Therefore, for the terminal device and/or the network device, switching of the BWPs. TCIs, or SSBs may be actually performed. In addition, a cell or a beam described in this application may alternatively be replaced with a BWP, a TCI, or an SSB.

In a possible implementation, the configuration information may further include a second threshold. The second threshold includes at least one of the following thresholds: a reference signal received power (RSRP) threshold, a signal-to-noise ratio (SNR) threshold, a bit energy-to-noise power spectral density ratio threshold, a channel quality indicator (CQI) threshold, a signal-to-interference-plus-noise ratio (SINR) threshold, or a reference signal received quality (RSRQ) threshold.

Based on this, that the terminal device receives a first threshold and a second threshold that correspond to a candidate cell and that are configured by the network device, and determines a target cell from the at least one candidate cell based on the configuration information may include: The terminal device detects information related to the first threshold based on a downlink broadcast signal of the candidate cell or the source cell, and determines that the one or more candidate cells meet the first threshold and a determining condition for the first threshold; detects information related to the second threshold based on a downlink broadcast signal of the candidate cell, and determines that the one or more candidate cells meet the second threshold and a determining condition for the second threshold; and determines that the one or more candidate cells meet the handover condition and determines the candidate cell as the target cell.

For example, first threshold information of the candidate cell 1 received by the terminal device may be a Doppler frequency shift threshold D_threshold, and the second threshold may be an RSRP threshold RSRP_threshold. When the terminal device detects a Doppler frequency shift value Doppler of the current candidate cell 1 and a current RSRP, the terminal device may determine, according to a preset determining manner, that the candidate cell 1 meets the handover condition, and the candidate cell 1 is the target cell. The preset determining manner is, for example, the terminal device detects that the Doppler is greater than or equal to D_threshold and the RSRP is greater than or equal to RSRP_threshold. When detecting that the Doppler is less than D_threshold or the RSRP is less than RSRP_threshold, the terminal device determines that the candidate cell 1 does not meet the handover condition.

In the foregoing embodiment of this application, the network device configures at least two CHO trigger conditions for the terminal device, for example, the Doppler frequency shift threshold and the reference signal received power threshold, to determine the target cell for handover through dual verification, so that in an overlapping area of cells, the terminal device can accurately trigger the handover in time, thereby improving CHO switching accuracy and timeliness, and improving user experience.

In another possible implementation, the configuration information further includes indication information, and the indication information indicates a first determining condition when the first threshold is used to determine the target cell and a second determining condition when the second threshold is used to determine the target cell.

The first determining condition indicates that when the one or more candidate cells meet the determining condition for the first threshold, for example, a parameter corresponding to the candidate cell is greater than or less than the first threshold, it is considered that the one or more candidate cells meet the handover condition. Similarly, the second determining condition indicates that when the one or more candidate cells meet the condition corresponding to the second threshold, it is considered that the one or more candidate cells meet the handover condition.

Based on this, that the terminal device determines a target cell from the at least one candidate cell based on the configuration information may include: If the terminal device determines that the one or more candidate cells meet the first determining condition for the first threshold of the candidate cell and meets the second determining condition of for the second threshold of the candidate cell, the terminal device determines that the one or more candidate cells meet the handover condition.

For example, the configuration information may include a Doppler frequency shift threshold D_threshold, which is a first threshold of the candidate cell 1, and the configuration information further includes an RSRP threshold RSRP_threshold, which is a second threshold of the candidate cell 1. Correspondingly, the configuration information further includes the first determining condition, and the first determining condition is that a Doppler frequency shift of the candidate cell 1 is less than the D_threshold. The configuration information further includes the second determining condition, and the second determining condition is that an RSRP of the candidate cell 1 is greater than the RSRP_threshold. When the terminal device determines that a downlink RSRP of the current candidate cell 1 is greater than RSRP_threshold, and detects that a Doppler frequency shift value Doppler of the candidate cell 1 is less than D_threshold, the terminal device determines that the candidate cell 1 meets the handover condition. Therefore, when the terminal device determines that a downlink RSRP of the current candidate cell 1 is less than or equal to RSRP_threshold, or detects that the Doppler frequency shift value Doppler of the candidate cell 1 is greater than or equal to D_threshold, the terminal device determines that the candidate cell 1 meets the handover condition.

It should be noted that the first threshold information, the second threshold, the first determining condition, or the second determining condition of the network device may be set by a person skilled in the art based on factors such as timeliness and accuracy of cell switching, which may be obtained through calculation based on satellite ephemeris information obtained by the network device. This is not specifically limited in this embodiment of this application.

The satellite ephemeris information includes parameters such as satellite flight time, coordinates, azimuth, and speed that are determined based on a mathematical relationship between satellite orbit parameters, and has very high precision. The satellite can be accurately calculated, predicted, described and tracked based on the ephemeris information. An operating status of a flying object such as time, a position and a velocity may be calculated.

In the foregoing embodiment of this application, the network device configures at least two CHO determining conditions for the terminal device. In addition, due to satellite movement trajectory and a relative motion relationship between the satellite and a terminal device, the determining conditions for the first threshold and the second threshold are not fixed, but change relatively in different cases. Therefore, the configuration information may further include the first determining condition and the second determining condition, so that the terminal device may detect in real time whether the one or more candidate cells meet the handover condition based on the configuration information, and determine the target cell from the at least one candidate cell. The foregoing CHO trigger mechanism can enable the terminal device to accurately trigger a handover in time, thereby improving CHO switching accuracy and timeliness, and improving user experience.

In the foregoing implementation, the first threshold information in the configuration information may further include the following several manners. Descriptions are made in the following with examples, and the following examples do not constitute a specific limitation on the first threshold information.

Manner 1: The first threshold information may include a specific value of the first threshold.

Based on this, the first determining condition may be that a parameter value is greater than or equal to the first threshold, less than the first threshold, greater than the first threshold, less than or equal to the first threshold, or the like.

For example, assuming that a satellite works in a regeneration mode, as shown in the following Table 1, a first threshold and a first determining condition may be configured based on relative motion between a terminal device and the satellite.

TABLE 1

| Terminal device and satellite | First threshold and first determining condition | | |
| --- | --- | --- | --- |
| | Doppler frequency shift threshold D_threshold | TA rate threshold TAR_threshold | Doppler frequency shift change rate threshold DR_threshold |
| Approaching motion | Doppler frequency shift (positive value) ≥ D_threshold | TA rate (negative value) ≥ TAR_threshold; TA rate (absolute value) ≤ TAR_threshold | Doppler frequency shift change rate (negative value) ≤ DR_threshold; Doppler frequency shift change rate (absolute value) ≥ DR_threshold |
| Receding motion | Doppler frequency shift (negative value) ≤ D_threshold; Doppler frequency shift (absolute value) ≥ D_threshold | TA rate (positive value) ≥ TAR_threshold | Doppler frequency shift change rate (negative value) ≥ DR_threshold; Doppler frequency shift change rate (absolute value) ≤ DR_threshold |

The relative motion between the terminal device and the satellite may be OFF motion or TO motion. The OFF motion in this application means that a relative distance between the terminal device and the satellite gradually decreases. The satellite moves toward the terminal device, but a moving speed of the terminal device can be ignored compared with a moving speed of the satellite. Even if the terminal device moves at an opposite direction of the satellite, as the relative moving speed of the terminal device and the satellite is a positive value, it may be considered that the relative motion between the terminal device and the satellite is OFF motion. Conversely, the TO motion in this application means that a relative distance between the terminal device and the satellite gradually increases.

As shown in the foregoing Table 1, when OFF motion between the terminal device and the satellite is determined, that is, if the first threshold of the candidate cell is a Doppler frequency shift threshold, the first determining condition is that the Doppler frequency shift of the candidate cell is greater than or equal to the Doppler frequency shift threshold; if the first threshold of the candidate cell is a Doppler frequency shift change rate threshold, the first determining condition is that the Doppler frequency shift change rate of the candidate cell is less than or equal to the Doppler frequency shift change rate threshold; or if the first threshold of the candidate cell is a TA rate threshold, the first determining condition is that the TA rate of the candidate cell is greater than or equal to the TA rate threshold.

When a TO motion between the terminal device and the satellite is determined, that is, if the first threshold of the candidate cell is a Doppler frequency shift threshold, the first determining condition is that a Doppler frequency shift of any candidate cell is less than or equal to the Doppler frequency shift threshold, if the first threshold of the candidate cell is a Doppler frequency shift change rate threshold, the first determining condition is that a Doppler frequency shift change rate of any candidate cell is greater than or equal to the Doppler frequency shift change rate threshold; or if the first threshold of the candidate cell is a TA rate threshold, the first determining condition is that a TA rate of any candidate cell is greater than or equal to the TA rate threshold.

Figure 5:
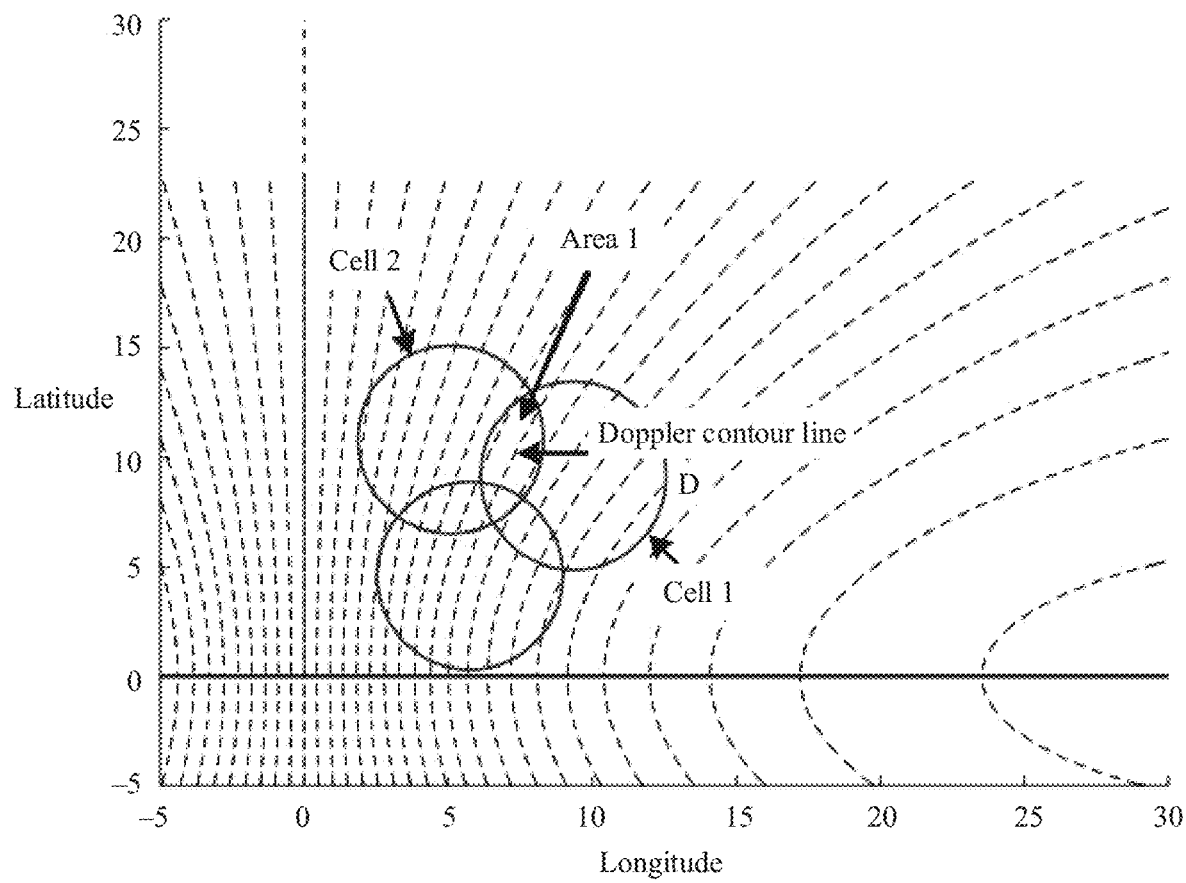
FIG. 5 is a schematic diagram of an example of a network resource configuration method according to an embodiment of this application.

For example, as shown in FIG. 5, a satellite works in a non-gaze mode, and a closed curve in the figure represents a beam or a cell in a coverage area of the satellite. The coverage area of the cell moves along with the motion of the satellite, that is, a relative position relationship between the coverage area of the cell and the satellite remains unchanged. At this time, the satellite is right above the latitude and longitude (0, 0) and moves from west to east along the equator. The satellite operates at an orbital altitude of 1200 km with a minimum elevation of 10 degrees. It is assumed that a source cell of UE is a cell 1, and the UE is entering a cell 2 through an area 1, where the area 1 is an overlapping area of the cell 1 and the cell 2.

The UE receives configuration information sent by a network device and the configuration information includes a Doppler frequency shift threshold D_threshold and a reference signal received power threshold RSRP_threshold of the cell 2. As a relative motion between the UE and the satellite is OFF motion, the first determining condition configured in this case may be that a Doppler frequency shift value Doppler is greater than or equal to D_threshold. When the UE detects that the Doppler frequency shift value Doppler, of the cell 2 is greater than or equal to D_threshold and the downlink RSRP is greater than or equal to RSRP_threshold, the UE determines that the cell 2 meets the handover condition, and triggers a CHO.

In the foregoing example, as the UE moves, when the UE detects that a Doppler frequency shift value of a cell is greater than or equal to D_threshold, it indicates that the UE has entered the coverage area of the cell 2 and gradually approaches the edge of the cell 1, and a handover needs to be performed. This can be an optimal occasion for triggering the CHO and the UE may be automatically handed over to the cell 2.

Figure 6:
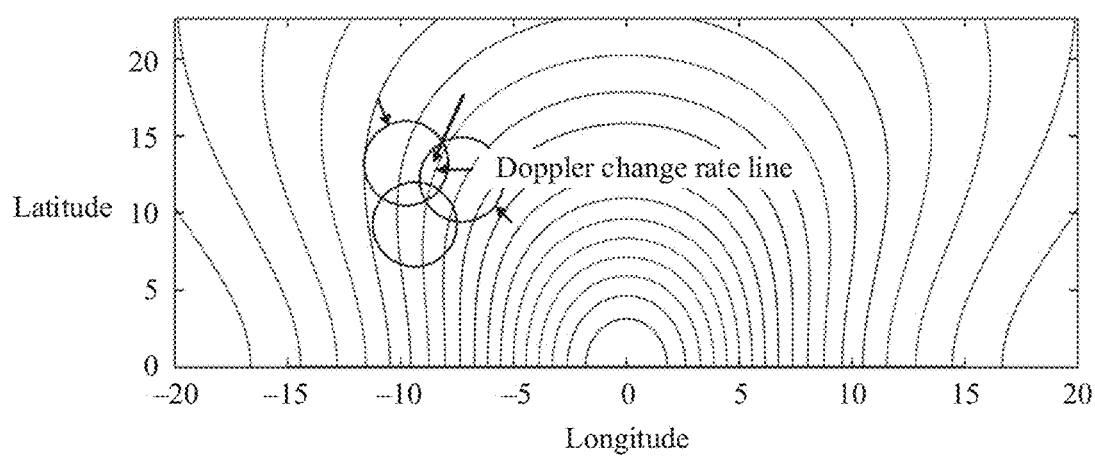
FIG. 6 is a schematic diagram of an example of another network resource configuration method according to an embodiment of this application.

For another example, as shown in FIG. 6, a satellite works in a non-gaze mode, and a closed curve in the figure represents a beam or a cell in a coverage area of the satellite. The coverage area of the cell moves along with the motion of the satellite, that is, a relative position relationship between the coverage area of the cell and the satellite remains unchanged. At this time, the satellite is right above the latitude and longitude (0, 0) and moves from west to east along the equator. The satellite operates at an orbital altitude of 1200 km with a minimum elevation of 10 degrees. It is assumed that a source cell of UE is a cell 1, and the UE is entering a cell 2 through an area 1, where the area 1 is an overlapping area of the cell 1 and the cell 2.

The UE receives configuration information sent by a network device and the configuration information includes a Doppler frequency shift change rate threshold DR_threshold and a reference signal received power threshold RSRP_threshold of the cell 2. As a relative motion between the UE and the satellite is TO motion, the first determining condition configured in this case may be that a Doppler frequency shift value change rate is greater than or equal to DR_threshold. When the UE detects that the Doppler frequency shift change rate of the cell 2 is greater than or equal to DR_threshold and the downlink RSRP is greater than or equal to RSRP_threshold, the UE determines that the cell 2 meets the handover condition, and triggers a CHO.

In the foregoing example, as the UE moves, when the UE detects that a Doppler frequency shift change rate of a cell is greater than or equal to DR_threshold, it indicates that the UE has entered the coverage area of the cell 2 and gradually approaches the edge of the cell 1, and a handover needs to be performed. This can be taken as an optimal timing for triggering the CHO and the UE may be automatically handed over to the cell 2.

Manner 2: The first threshold information may include an index number corresponding to the first threshold.

In an implementation, a satellite works in a non-gaze mode, and a coverage area of a cell moves along with the motion of the satellite. That is, a relative position relationship between the coverage area of the cell and the satellite remains unchanged, and a relative position relationship between an overlapping area of two cells and the satellite remains unchanged.

Based on this, a network device may configure an index number of a first threshold for UE, so that the UE obtains the first threshold by querying a preset data table. As shown in Table 2, a base station sends an index number of a Doppler frequency shift threshold of a candidate cell to the UE, and the UE may query and obtain a relevant Doppler frequency shift threshold according to the preconfigured information in Table 2.

TABLE 2

| Index number | First threshold |
| --- | --- |
| 00 | Doppler frequency shift threshold 1 |
| 01 | Doppler frequency shift threshold 2 |
| 10 | Doppler frequency shift threshold 3 |
| 11 | Doppler frequency shift threshold 4 |

The Doppler frequency shift threshold in Table 2 is determined by the network device based on a relative position between the UE and the satellite when the UE performs an inter-cell handover. For example, the Doppler frequency shift threshold 1 may be 1.8 kHz or 0.6 ppm. The network device may preconfigure the information shown in Table 2 for the UE, or periodically send or update the information to the UE by using RRC signaling or the like.

For example, any index number in the index table may further correspond to a plurality of first thresholds, as shown in the following table. When receiving an index number 01 included in the configuration information from the network device, the UE may obtain a Doppler frequency shift threshold 2 and a TA rate threshold 2 by looking up the table. The two thresholds are used to determine whether a candidate cell meets the handover condition. The TA rate threshold may be a positive value or a negative value, for example, 0.8 ms/s.

TABLE 3

| Index number | First threshold |
| --- | --- |
| 00 | Doppler frequency shift threshold 1, TA rate threshold 1 |
| 01 | Doppler frequency shift threshold 2, TA rate threshold 2 |
| 10 | Doppler frequency shift threshold 3, TA rate threshold 3 |
| 11 | Doppler frequency shift threshold 4, TA rate threshold 4 |

For example, the index table may alternatively be in another form. As shown in the following table, when the UE receives 110, it indicates that the determining threshold is a Doppler frequency shift change rate threshold 1, and whether a candidate cell meets the handover condition may be determined according to the threshold. The Doppler frequency shift change rate threshold may be a positive value or a negative value, for example, 0.8 kHz/s.

TABLE 4

| Index number | First threshold |
| --- | --- |
| 000 | Doppler frequency shift threshold 1 |
| 001 | Doppler frequency shift threshold 2 |
| 010 | Doppler frequency shift threshold 3 |
| 011 | Doppler frequency shift threshold 4 |
| 100 | TA rate threshold 1 |
| 101 | TA rate threshold 2 |
| 110 | Doppler frequency shift change rate threshold 1 |
| 111 | Doppler frequency shift change rate threshold 2 |

In the foregoing example, the network device configures the first threshold information for the terminal device based on the index number, avoiding frequent delivering of configuration information to the terminal device and effectively saving signaling overheads.

Manner 3: The first threshold information includes intermediate information for calculating the first threshold.

Based on intermediate information corresponding to a candidate cell, the terminal device may obtain a first threshold corresponding to the candidate cell according to a preset calculation method.

The intermediate information may include coordinate information of a reference point in an overlapping area of a source cell and a candidate cell of the terminal device, or the intermediate information may include an included angle between a satellite motion direction and the reference point of the overlapping area of the source cell and a candidate cell.

Figure 7:
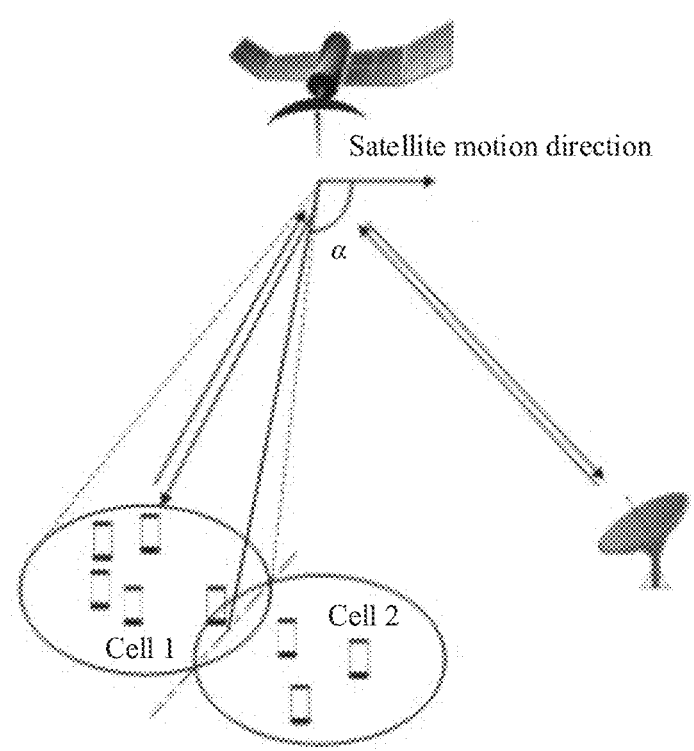
FIG. 7 is a schematic diagram depicting an architecture of a communication system according to an embodiment of this application.

For example, as shown in FIG. 7, an included angle between a reference point A of an overlapping area of a cell 1 and a cell 2 and a satellite motion direction is a. The network device sends angle information to UE, and the UE may calculate and obtain a Doppler frequency shift threshold, a TA rate threshold, or a Doppler frequency shift change rate threshold according to a preset calculation formula. It may be preset that both the network device and the terminal device obtain the first threshold according to a unified calculation formula.

If the first threshold is the Doppler frequency shift threshold, a formula for calculating the Doppler frequency shift threshold is:

$$D = f_d \frac{V \cdot \cos(\alpha) + V_{UE}}{c},$$

where D represents the Doppler frequency shift threshold, V represents a moving speed of the satellite, $V_{UE}$ represents a moving speed of the terminal device, c represents the speed of light, $f_d$ represents a frequency at which the network device of the candidate cell or the source cell sends a signal to the terminal device, and α represents the included angle between the satellite motion direction and the reference point of the overlapping area of the source cell and the candidate cell.

In the foregoing implementation, when the moving speed $V_{UE}$ of the terminal device is high, for example, the terminal device is located on a transportation facility, for example, an airplane, a bullet train, or a train, the Doppler frequency shift threshold may be calculated according to the foregoing formula. It may be assumed that a relative speed $V_{UE}$ (which is a positive value in the case of OFF motion and a negative value in the case of TO motion) between the satellite and the UE is generated due to motion of the terminal device, a value of $V_{UE}$ may be a value range of the moving speed of the terminal device that is set by the network device.

When the moving speed $V_{UE}$ of the terminal device is slower than the moving speed of the satellite, and the Doppler frequency shift threshold obtained by calculation is almost not affected, $V_{UE}$ may be ignored. The foregoing formula may be modified as follows:

$$D = f_d \frac{V \cdot \cos(\alpha)}{c}.$$

If the first threshold is the TA rate threshold, a formula for calculating the TA rate threshold is:

$$TAR = -\frac{2[V \cdot \cos(\alpha) + V_{UE}]}{c},$$

where TAR represents the TA rate threshold.

When the moving speed $V_{UE}$ of the terminal device is slower than the moving speed of the satellite, and the TA rate threshold obtained by calculation is almost not affected, $V_{UE}$ may be ignored. The foregoing formula may be modified as follows:

$$TAR = -\frac{2[V \cdot \cos(\alpha)]}{c}.$$

In another implementation, the intermediate information may further be coordinate information of a reference point in an overlapping area of a source cell and a candidate cell of the terminal device. For example, the network device may send, to the terminal device, coordinate information of the reference point in the overlapping area of the cell 1 and the cell 2. The terminal device may calculate and obtain the included angle α based on the coordinate information of the reference point, the location information of the satellite, and the motion direction of the satellite (which may be obtained from the satellite ephemeris information). Then, a corresponding Doppler frequency shift threshold, a TA rate threshold, or a Doppler frequency shift change rate threshold is calculated according to an agreed formula, and details are not described herein again.

In the foregoing example, the terminal device may obtain the first threshold through calculation according to a preset formula based on angle information between an overlapping area of a source cell and a candidate cell and a satellite motion direction, reference point coordinate information, angle information, or the like in the configuration information delivered by the network device, to determine whether the one or more candidate cells meet the handover condition. In the foregoing implementation, frequent delivering of configuration information to the terminal device is avoided, effectively saving signaling overheads and reducing information update frequency.

It should be noted that first threshold information corresponding to different candidate cells may be different. In other words, for different candidate cells, the network device may configure a plurality of pieces of and different first threshold information and CHO determining conditions for the terminal device.

Figure 8:
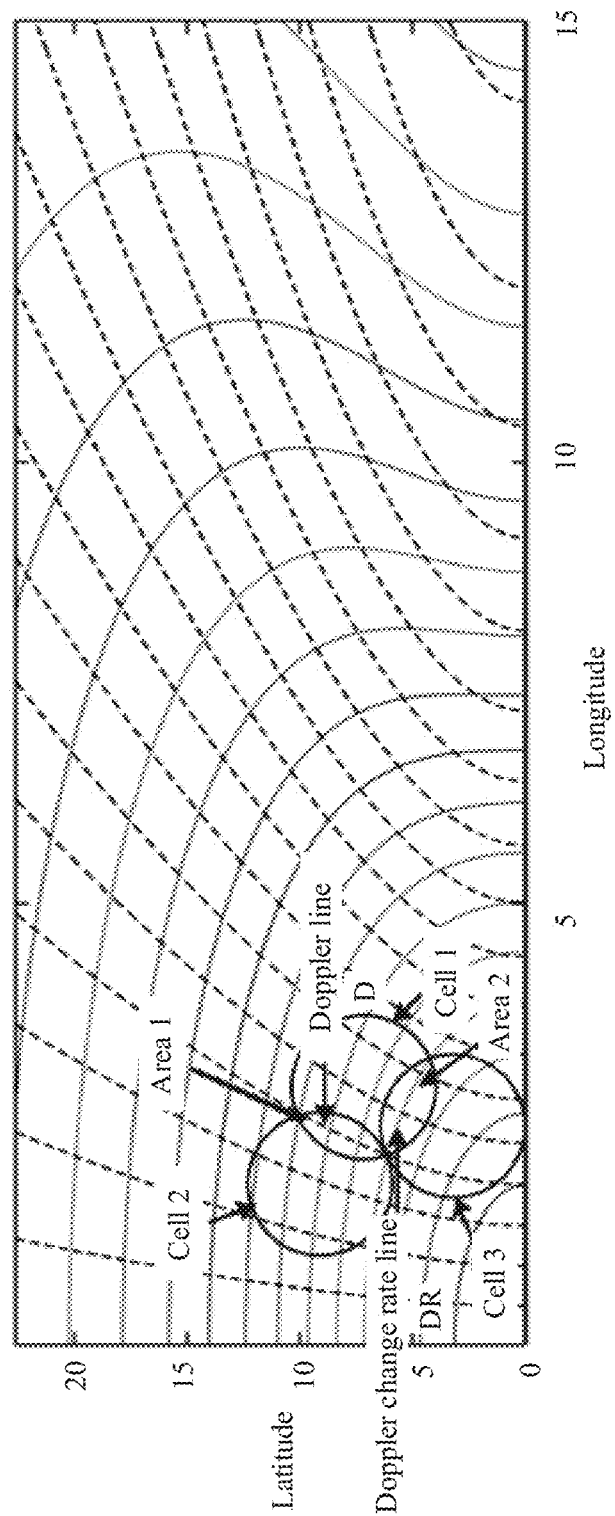
FIG. 8 is a schematic diagram of an example of another network resource configuration method according to an embodiment of this application.

For example, as shown in FIG. 8, a satellite works in a non-gaze mode, and a closed curve in the figure represents a beam or a cell in a coverage area of the satellite. The coverage area of the cell moves along with the motion of the satellite, that is, a relative position relationship between the coverage area of the cell and the satellite remains unchanged. At this time, the satellite is right above the latitude and longitude (0, 0) and moves from west to east along the equator. The satellite operates at an orbital altitude of 1200 km with a minimum elevation of 10 degrees. It is assumed that a source cell of UE is a cell 1, and the UE is entering a cell 2 through an area 1, or entering a cell 3 through an area 2. The area 1 is an overlapping area of the cell 1 and the cell 2. The area 2 is an overlapping area of the cell 1 and the cell 3.

The UE receives configuration information sent by the network device and the configuration information may include a first threshold and a second threshold corresponding to the cell 2, a Doppler frequency shift threshold D_threshold and a downlink reference signal received power threshold RSRP_threshold 1. The configuration information may further include a first threshold and a second threshold corresponding to the cell 3: a Doppler frequency shift change rate threshold DR_threshold and a downlink reference signal received power threshold RSRP_threshold 2. The first thresholds corresponding to the cell 2 and the cell 3 are different.

If the UE detects that a downlink RSRP of cell 2 is greater than RSRP_threshold 1, and it is determined that a Doppler frequency shift value of the cell 2 is less than D_threshold according to a preset determining condition or a first determining condition indicated in the configuration information, it is determined that the cell 2 meets the handover condition.

If the UE detects that a downlink RSRP of the cell 3 is greater than RSRP_threshold 2, and it is determined that a Doppler frequency shift change rate value of the cell 3 is less than DR_threshold according to a preset determining condition or a first determining condition indicated in the configuration information, it is determined that the cell 3 meets the handover condition.

In another implementation, the configuration information may further include priority information corresponding to a plurality of candidate cells, and the priority information is used by the terminal device to determine a target cell from the plurality of candidate cells based on priorities corresponding to the plurality of candidate cells. That the terminal device determines a target cell from the at least one candidate cell based on the configuration information may include: The terminal device determines a candidate cell with a highest priority as the target cell based on priority information corresponding to the at least one candidate cell.

With reference to the foregoing embodiment, as shown in FIG. 8, when the UE detects that both the cell 2 and the cell 3 meet the handover condition, the UE determines a cell with a higher priority from the cell 2 and the cell 3 as the target cell according to priority information configured by the network device. For example, if the configuration information indicates that the priority of the cell 3 is higher than the priority of the cell 2, it is determined that the cell 3 is the target cell, and the terminal device is handed over to the cell 3.

Determining of the priority information may be related to least one of duration of the terminal device camping on a candidate cell, signal strength of a candidate cell received by the terminal device, or a quantity of terminal devices that have accessed a candidate cell. For example, if the network device determines that the terminal device camps on a candidate cell for a relatively longer time based on the relative motion between the satellite and the terminal device, the network device determines that the candidate cell has a higher priority, and a candidate cell with shorter camping time has a lower priority.

For example, the network device sends a list of a plurality of CHO candidate cells to the terminal device. Alternatively, when sending configuration information corresponding to at least one candidate cell to the terminal device, the network device may send the configuration information according to a priority order of the candidate cells, so that the terminal device can obtain the priority order of the plurality of candidate cells. For example, the configuration information corresponding to the candidate cells is sent according to a descending order of priorities of the candidate cells.

In the foregoing example, the configuration information sent by the network device to the terminal device carries priority information of each candidate cell, so that the terminal device can determine a target cell that meets an optimal handover condition from a plurality of candidate cells based on the priority information, thereby improving switching accuracy and timeliness, and improving user experience.

In an implementation, if the configuration information carried in an RRC message or DCI signaling is sent to a terminal device, the network device may send the configuration information only to a terminal device at the cell edge, for example, send the configuration information to at least one terminal device at the cell edge in a multicast manner.

For example, the following uses RRCReconfiguration signaling in an inter-cell handover signaling procedure as an example, where the signaling in bold is signaling newly added for transmission of the configuration information

| | |
|---|---|
| RRCReconfiguration ::= | SEQUENCE { |
| rrc-TransactionIdentifier | RRC-TransactionIdentifier, |
| criticalExtensions | CHOICE { |
| rrcReconfiguration | RRCReconfiguration-IEs, |
| criticalExtensionsFuture | SEQUENCE { } |
| } | |
| } | |
| RRCReconfiguration-IEs ::= | SEQUENCE { |
| radioBearerConfig | RadioBearerConfig OPTIONAL, -- Need M |

| | |
|---|---|
| CHOThreshold | ThresholdList |
| secondaryCellGroup | OCTET STRING (CONTAINING CellGroupConfig) |
| OPTIONAL, -- Need M | |
|   measConfig | MeasConfig     OPTIONAL, -- Need M |
|   lateNonCriticalExtension | OCTET STRING   OPTIONAL, |
|   nonCriticalExtension | SEQUENCE { }   OPTIONAL |
| } | |

A specific format of ThresholdList in the RRCReconfiguration signaling may be configured based on different signaling combinations enumerated in the foregoing embodiment of this application. For example, a specific format thereof may be as follows:

```
ThresholdList ::=           SEQUENCE {
    DopplerThreshold        BIT STRING (SIZE (n)),
}
or
ThresholdList ::=           SEQUENCE {
    TARateThreshold         BIT STRING (SIZE (n)),
}
or
ThresholdList ::=           SEQUENCE {
    DopplerRateThreshold    BIT STRING (SIZE (n)),
}
or
ThresholdList ::=           SEQUENCE {
    DopplerThreshold        BIT STRING (SIZE (n)),
    TARateThreshold         BIT STRING (SIZE (n)),
}
```

In addition, BWP switching may be used as a carrier for cell or beam switching. Therefore, configuration information of a first threshold may be further transmitted in BWP-related signaling. For example, the configuration information of the first threshold is carried in initial BWP signaling, BWP-DownlinkCommon signaling, BWP-UplinkCommon signaling, BWP-DownlinkDedicated signaling, BWP-UplinkDedicated signaling, or the like. The following uses BWP-DownlinkDedicated signaling as an example for description.

```
BWP-DownlinkDedicated::=    SEQUENCE {
    pdcch-Config            SetupRelease { PDCCH-Config }
    pdsch-Config            SetupRelease { PDSCH-Config }
    sps-Config              SetupRelease { SPS-Config }
    radioLinkMonitoringConfig   SetupRelease
{ RadioLinkMonitoringConfig }
    CHOThreshold            ThresholdList
    ...
}
```

Figure 9:
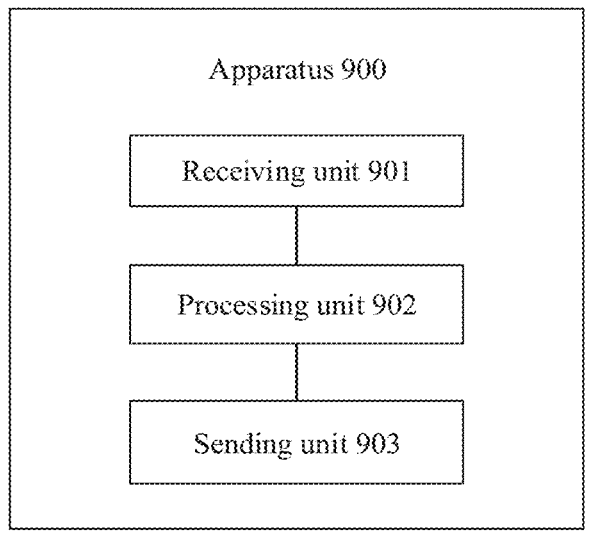
FIG. 9 is a schematic diagram of a network resource configuration apparatus according to an embodiment of this application.

An embodiment of this application further provides a network resource configuration apparatus. As shown in FIG. 9, an apparatus 900 may include a receiving unit 901, a processing unit 902, and a sending unit 903.

The receiving unit 901 may be configured to receive configuration information from a network device, where the configuration information includes first threshold information corresponding to at least one candidate cell, and a first threshold includes at least one of a Doppler frequency shift threshold, a timing advance TA rate threshold, or a Doppler frequency shift change rate threshold.

The processing unit 902 may be configured to determine a target cell from the at least one candidate cell based on the configuration information.

The sending unit 903 may be configured to initiate a handover to the target cell.

For a specific execution process and embodiments of the apparatus 900, refer to steps performed by the terminal device in the foregoing method embodiments and related descriptions. Details are not described herein again.

Figure 10:
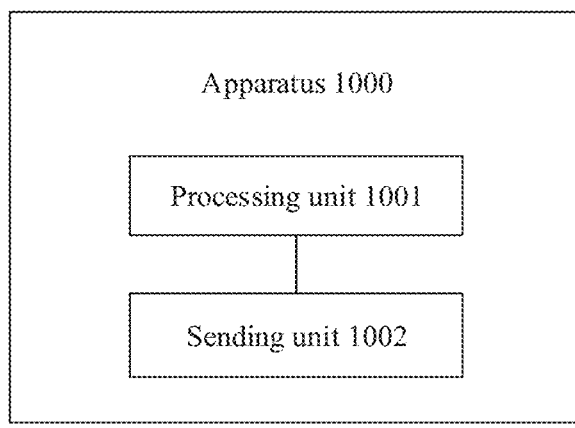
FIG. 10 is a schematic diagram of another network resource configuration apparatus according to an embodiment of this application.

In addition, an embodiment of this application further provides a network resource configuration apparatus. As shown in FIG. 10, an apparatus 1000 may include a processing unit 1001 and a sending unit 1002.

The processing unit 1001 may be configured to obtain first threshold information corresponding to at least one candidate cell, where the first threshold includes at least one of a Doppler frequency shift threshold, a timing advance TA rate threshold, or a Doppler frequency shift change rate threshold.

The sending unit 1002 may be configured to send configuration information to a terminal device, where the configuration information includes the first threshold information corresponding to the at least one candidate cell, and the configuration information is used by the terminal device to determine a target cell from a plurality of candidate cells based on the configuration information.

For a specific execution process and embodiments of the apparatus 1000, refer to steps performed by the network device in the foregoing method embodiments and related descriptions. Details are not described herein again.

In still another implementation, the apparatus 900 and the apparatus 1000 may be a chip or an integrated circuit. In this implementation, the sending unit and the receiving unit shown in FIG. 9 and FIG. 10 may be communication interfaces. Optionally, the communication interface may be an input/output interface or a transceiver circuit. The processing unit 902 or the processing unit 1001 may be a processing apparatus. Some or all functions of the processing apparatus may be implemented by software.

In an example, the processing apparatus may include a memory and a processor. The memory is configured to store a computer program, and the processor reads and executes the computer program stored in the memory, to perform processing implemented inside the terminal device in the embodiments, for example, to perform the processing that is performed by the processing unit 902 or the processing unit 1001 described above. Optionally, the memory and the processor may be coupled by using an interface or a bus, or may be integrated.

Optionally, the processing apparatus may include a processor only, and a memory configured to store a computer program is located outside the processing apparatus. The processor is connected to the memory by using a circuit/wire, to read and execute the computer program stored in the memory.

In another example, some or all functions of the processing apparatus may be implemented by software. For example, the processing apparatus may include an input interface circuit, a logic circuit, and an output interface circuit. For the apparatus 1000, the input interface circuit may be configured to receive configuration information that is corresponding to at least one neighbor cell and that is sent by a network device; the logic circuit may be configured to determine a target cell from the at least one neighbor cell according to the at least one piece of configuration information; and the output interface circuit may be configured to initiate a handover request to the target cell. In addition, for the apparatus 1000, the logic circuit may be configured to determine configuration information corresponding to different neighbor cells, and the output interface circuit may be configured to output the configuration information to a terminal device.

In another example, the processing apparatus may include a memory and a processor. The memory is configured to store a computer program, and the processor reads and executes the computer program stored in the memory, to perform processing implemented inside the terminal device in the embodiments, for example, to perform the processing that is performed by the processing unit described above.

Optionally, the processing apparatus may include a processor only, and a memory configured to store a computer program is located outside the processing apparatus. The processor is connected to the memory by using a circuit/wire, to read and execute the computer program stored in the memory.

An embodiment of this application further provides a chip. The chip includes a processor. A memory configured to store a computer program is disposed independent of the chip. The processor is configured to execute the computer program stored in the memory, to perform an operation that is performed by the terminal device in any method embodiment.

Further, the chip may include a communication interface. The communication interface may be an input/output interface, an input/output circuit, or the like. Further, the memory may be further integrated into the chip.

The processor in embodiments of this application may be an integrated circuit chip, and has a signal processing capability. In an implementation process, steps in the foregoing method embodiments can be implemented by using a hardware integrated logic circuit in the processor, or by using instructions in a form of software. The processor may be a general-purpose processor, a digital signal processor (DSP), an application-specific integrated circuit (ASIC), a field programmable gate array (FPGA), another programmable logic device, a discrete gate, a transistor logic device, or a discrete hardware component. The general-purpose processor may be a microprocessor, or the processor may be any conventional processor or the like. The steps of the methods disclosed in embodiments of this application may be directly executed and completed by using a hardware encoding processor, or may be executed and completed by using a combination of hardware and software modules in the encoding processor. The software module may be located in a mature storage medium in the art, such as a random access memory, a flash memory, a read-only memory, a programmable read-only memory, an electrically erasable programmable memory, or a register. The storage medium is located in a memory, and the processor reads information in the memory and completes the steps in the foregoing methods in combination with hardware of the processor.

The memory in embodiments of this application may be a volatile memory or a non-volatile memory, or may include a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM) and is used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus random access memory (DRRAM). It should be noted that the memories in the system and method described in this specification include but are not limited to these memories and any memory of another suitable type.

A person of ordinary skill in the art may be aware that, in combination with units and algorithm steps in the examples described in embodiments disclosed in this specification, the embodiments may be implemented by electronic hardware or a combination of computer software and electronic hardware. This specifically depends on specific applications and design constraints of the technical solutions. A person skilled in the art may use different methods to implement the described functions for each particular application, but it should not be considered that the implementation goes beyond the scope of this application.

The units described as separate parts may or may not be physically separate, and parts displayed as units may or may not be physical units, may be located in one location, or may be distributed on a plurality of network units. Some or all of the units may be selected based on an actual requirement to achieve objectives of the embodiments of this application.

In addition, function units in embodiments of this application may be integrated into one processing unit, or each of the units may exist alone physically, or two or more units are integrated into one unit.

When the functions are implemented in a form of a software function unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of this application.

The foregoing descriptions are merely specific implementations of this application, but are not intended to limit the protection scope of this application. Any variation or replacement readily figured out by a person skilled in the art within the technical scope disclosed in this application shall fall within the protection scope of this application.

What is claimed is:

1. A network resource configuration method, wherein the method comprises:
   receiving, by a terminal device, configuration information, wherein the configuration information comprises information of a first threshold corresponding to at least one candidate cell, the first threshold comprises at least one of a Doppler frequency shift threshold, a timing advance (TA) rate threshold, or a Doppler frequency shift change rate threshold, the information of the first threshold comprises intermediate information for calculating the first threshold, and the intermediate information comprises coordinate information of a reference point in an overlapping area of a source cell and a candidate cell of the terminal device, or the intermediate information comprises an included angle between a satellite motion direction and the reference point of the overlapping area; and wherein:

if the intermediate information comprises the included angle, and the first threshold is the Doppler frequency shift threshold, a formula for calculating the Doppler frequency shift threshold is:

$$D = f_d \frac{V \cdot \cos(\alpha) + V_{UE}}{c},$$

wherein D represents the Doppler frequency shift threshold, V represents a moving speed of a satellite, $V_{UE}$ represents a moving speed of the terminal device, c represents the speed of light, $f_d$ represents a frequency at which a network device of the candidate cell or the source cell sends a signal to the terminal device, and $\alpha$ represents the included angle; and if the intermediate information comprises the included angle, and the first threshold is the TA rate threshold, a formula for calculating the TA rate threshold comprises:

$$TAR = -\frac{2[V \cdot \cos(\alpha) + V_{UE}]}{c},$$

wherein TAR represents the TA rate threshold;

determining, by the terminal device, a target cell from the at least one candidate cell based on the configuration information; and initiating, by the terminal device, a handover to the target cell.

2. The method according to claim 1, wherein a Doppler frequency shift indicates a Doppler frequency shift value between a signal sent by a network device of a candidate cell or a source cell and a signal received by the terminal device;

a Doppler frequency shift change rate indicates a change in a Doppler frequency shift value corresponding to a candidate cell or a source cell in unit time; and a TA rate indicates a change in a TA value used by the terminal device to send a signal to a candidate cell or a source cell in unit time.

3. The method according to claim 1, wherein the information of the first threshold comprises the first threshold or an index number corresponding to the first threshold.

4. The method according to claim 1, wherein the configuration information further comprises a second threshold, and the second threshold comprises at least one of the following thresholds: a reference signal received power RSRP threshold, a signal-to-noise ratio SNR threshold, a bit energy-to-noise power spectral density ratio threshold, a channel quality indicator CQI threshold, a signal-to-interference-plus-noise ratio SINR threshold, or a reference signal received quality RSRQ threshold.

5. The method according to claim 4, wherein the configuration information further comprises indication information, and the indication information indicates a first determining condition when the first threshold is used to determine the target cell and a second determining condition when the second threshold is used to determine the target cell.

6. The method according to claim 5, wherein the determining, by the terminal device, a target cell from the at least one candidate cell based on the configuration information comprises:

if the terminal device determines that one or more candidate cells meet the first determining condition for the first threshold of the candidate cell and meets the second determining condition for the second threshold of the candidate cell, determining, by the terminal device, that the one or more candidate cells meet a handover condition; and determining the target cell from the one or more candidate cells that meet the handover condition.

7. The method according to claim 5, wherein when it is determined that a relative distance between the terminal device and a satellite gradually decreases, if the first threshold of the candidate cell is the Doppler frequency shift threshold, the first determining condition is that a Doppler frequency shift of the candidate cell is greater than or equal to the Doppler frequency shift threshold;

if the first threshold of the candidate cell is the Doppler frequency shift change rate threshold, the first determining condition is that a Doppler frequency shift change rate of the candidate cell is less than or equal to the Doppler frequency shift change rate threshold; or if the first threshold of the candidate cell is the TA rate threshold, the first determining condition is that the TA rate of the candidate cell is greater than or equal to the TA rate threshold.

8. The method according to claim 5, wherein when it is determined that a relative distance between the terminal device and a satellite gradually increases, if the first threshold of the candidate cell is the Doppler frequency shift threshold, the first determining condition is that a Doppler frequency shift of the candidate cell is less than or equal to the Doppler frequency shift threshold;

if the first threshold of the candidate cell is the Doppler frequency shift change rate threshold, the first determining condition is that a Doppler frequency shift change rate of the candidate cell is greater than or equal to the Doppler frequency shift change rate threshold; or if the first threshold of the candidate cell is the TA rate threshold, the first determining condition is that the TA rate of the candidate cell is greater than or equal to the TA rate threshold.

9. A network resource configuration method, wherein the method comprises:

obtaining, by a network device, information of a first threshold corresponding to at least one candidate cell, wherein the first threshold comprises at least one of a Doppler frequency shift threshold, a timing advance (TA) rate threshold, or a Doppler frequency shift change rate threshold, the information of the first threshold comprises intermediate information for calculating the first threshold, and the intermediate information comprises coordinate information of a reference point in an overlapping area of a source cell and a candidate cell of a terminal device, or the intermediate information comprises an included angle between a satellite motion direction and the reference point of the overlapping area; and wherein:

if the intermediate information comprises the included angle, and the first threshold is the Doppler frequency shift threshold, a formula for calculating the Doppler frequency shift threshold is:

$$D = f_d \frac{V \cdot \cos(\alpha) + V_{UE}}{c},$$

wherein D represents the Doppler frequency shift threshold, V represents a moving speed of a satellite, $V_{UE}$ represents a moving speed of the terminal device, c represents the speed of light, $f_d$ represents a frequency at which a network device of the candidate cell or the source cell sends a signal to the terminal device, and α represents the included angle; and if the intermediate information comprises the included angle, and the first threshold is the TA rate threshold, a formula for calculating the TA rate threshold comprises:

$$TAR = -\frac{2[V \cdot \cos(\alpha) + V_{UE}]}{c},$$

wherein TAR represents the TA rate threshold; and sending, by the network device, configuration information to the terminal device, wherein the configuration information comprises the information of the first threshold corresponding to the at least one candidate cell, and the configuration information is used by the terminal device to determine a target cell for handover from a plurality of candidate cells based on the configuration information.

10. The method according to claim 9, wherein a Doppler frequency shift indicates a Doppler frequency shift value between a signal sent by a network device of a candidate cell or a source cell and a signal received by the terminal device;

a Doppler frequency shift change rate indicates a change in a Doppler frequency shift value corresponding to a candidate cell or a source cell in unit time; and a TA rate indicates a change in a TA value used by the terminal device to send a signal to a candidate cell or a source cell in unit time.

11. The method according to claim 9, wherein the information of the first threshold comprises the first threshold or an index number corresponding to the first threshold.

12. The method according to claim 9, wherein the configuration information further comprises a second threshold, and the second threshold comprises at least one of the following thresholds: a reference signal received power RSRP threshold, a signal-to-noise ratio SNR threshold, a bit energy-to-noise power spectral density ratio threshold, a channel quality indicator CQI threshold, a signal-to-interference-plus-noise ratio SINR threshold, or a reference signal received quality RSRQ threshold.

13. The method according to claim 12, wherein the configuration information further comprises indication information, and the indication information indicates a first determining condition when the first threshold is used to determine the target cell and a second determining condition when the second threshold is used to determine the target cell.

14. The method according to claim 9, wherein the configuration information further comprises priority information corresponding to the at least one candidate cell, and the priority information is related to at least one of duration of the terminal device camping on a candidate cell, signal strength of a candidate cell received by the terminal device, or a quantity of terminal devices that have accessed a candidate cell.

15. The method according to claim 14, wherein the priority information is used by the terminal device to determine a candidate cell with a highest priority from the at least one candidate cell as the target cell.

16. A communication system, comprising a terminal device and a network device, wherein:

the terminal device is configured to perform operations comprising:

receiving configuration information, wherein the configuration information comprises information of a first threshold corresponding to at least one candidate cell, and the first threshold comprises at least one of a Doppler frequency shift threshold, a timing advance (TA) rate threshold, or a Doppler frequency shift change rate threshold, the information of the first threshold comprises intermediate information for calculating the first threshold, and the intermediate information comprises coordinate information of a reference point in an overlapping area of a source cell and a candidate cell of the terminal device, or the intermediate information comprises an included angle between a satellite motion direction and the reference point of the overlapping area; and wherein:

if the intermediate information comprises the included angle, and the first threshold is the Doppler frequency shift threshold, a formula for calculating the Doppler frequency shift threshold is:

$$D = f_d \frac{V \cdot \cos(\alpha) + V_{UE}}{c},$$

wherein D represents the Doppler frequency shift threshold, V represents a moving speed of a satellite, $V_{UE}$ represents a moving speed of the terminal device, c represents the speed of light, $f_d$ represents a frequency at which a network device of the candidate cell or the source cell sends a signal to the terminal device, and α represents the included angle; and if the intermediate information comprises the included angle, and the first threshold is the TA rate threshold, a formula for calculating the TA rate threshold comprises:

$$TAR = -\frac{2[V \cdot \cos(\alpha) + V_{UE}]}{c},$$

wherein TAR represents the TA rate threshold;

determining a target cell from the at least one candidate cell based on the configuration information; and initiating a handover to the target cell; and the network device is configured to perform operations comprising:

obtaining, by the network device, the information of the first threshold corresponding to the at least one candidate cell, wherein the first threshold comprises at least one of the of the Doppler frequency shift threshold, the TA rate threshold, or the Doppler frequency shift change rate threshold; and sending, by the network device, the configuration information to the terminal device, wherein the configuration information comprises the information of the first threshold corresponding to the at least one candidate cell, and the configuration information is used by the terminal device to determine the target cell for handover from a plurality of candidate cells based on the configuration information.

17. The communication system according to claim 16, wherein a Doppler frequency shift indicates a Doppler frequency shift value between a signal sent by a network device of a candidate cell or a source cell and a signal received by the terminal device;
- a Doppler frequency shift change rate indicates a change in a Doppler frequency shift value corresponding to a candidate cell or a source cell in unit time; and
- a TA rate indicates a change in a TA value used by the terminal device to send a signal to a candidate cell or a source cell in unit time.

18. The communication system according to claim 16, wherein the information of the first threshold comprises the first threshold or an index number corresponding to the first threshold.

19. The communication system according to claim 16, wherein the configuration information further comprises a second threshold, and the second threshold comprises at least one of the following thresholds: a reference signal received power RSRP threshold, a signal-to-noise ratio SNR threshold, a bit energy-to-noise power spectral density ratio threshold, a channel quality indicator CQI threshold, a signal-to-interference-plus-noise ratio SINR threshold, or a reference signal received quality RSRQ threshold.

20. The communication system according to claim 19, wherein the configuration information further comprises indication information, and the indication information indicates a first determining condition when the first threshold is used to determine the target cell and a second determining condition when the second threshold is used to determine the target cell.

* * * * *

UNITED STATES PATENT AND TRADEMARK OFFICE
CERTIFICATE OF CORRECTION

PATENT NO. : 12,335,801 B2  
APPLICATION NO. : 17/883388  
DATED : June 17, 2025  
INVENTOR(S) : Xiaolu Wang et al.

Page 1 of 1

It is certified that error appears in the above-identified patent and that said Letters Patent is hereby corrected as shown below:

In the Claims

In Column 34, In Line 65, Claim 16, delete "of the of the" and insert -- of the --.

Signed and Sealed this  
Second Day of December, 2025

John A. Squires  
*Director of the United States Patent and Trademark Office*